US012485202B2

(12) United States Patent
Zhao et al.

(10) Patent No.: US 12,485,202 B2
(45) Date of Patent: Dec. 2, 2025

(54) SHAPE MEMORY ADHESIVE MATERIALS FOR DIABETIC WOUND HEALING

(71) Applicants: Massachusetts Institute of Technology, Cambridge, MA (US); Beth Israel Deaconess Medical Center, Boston, MA (US)

(72) Inventors: Xuanhe Zhao, Allston, MA (US); Hyunwoo Yuk, Cambridge, MA (US); Heejung Roh, Cambridge, MA (US); Aristidis Veves, Westwood, MA (US); Georgios Theocharidis, Cambridge, MA (US)

(73) Assignees: Massachusetts Institute of Technology, Cambridge, MA (US); Beth Israel Deaconess Medical Center, Boston, MA (US)

( * ) Notice: Subject to any disclaimer, the term of this patent is extended or adjusted under 35 U.S.C. 154(b) by 967 days.

(21) Appl. No.: 17/669,442

(22) Filed: Feb. 11, 2022

(65) Prior Publication Data
US 2024/0009346 A1  Jan. 11, 2024

Related U.S. Application Data

(60) Provisional application No. 63/148,901, filed on Feb. 12, 2021.

(51) Int. Cl.
*A61L 26/00* (2006.01)
*C09J 11/06* (2006.01)

(52) U.S. Cl.
CPC ......... *A61L 26/008* (2013.01); *A61L 26/0033* (2013.01); *A61L 26/0038* (2013.01); *A61L 26/0052* (2013.01); *A61L 26/0066* (2013.01); *A61L 26/0095* (2013.01); *C09J 11/06* (2013.01); *A61L 2400/16* (2013.01); *A61L 2430/34* (2013.01)

(58) Field of Classification Search
CPC .................................................... A61L 26/008
See application file for complete search history.

(56) References Cited

U.S. PATENT DOCUMENTS

| | | | |
|---|---|---|---|
| 11,904,067 B2* | 2/2024 | Zhao | A61B 5/68335 |
| 12,084,604 B2* | 9/2024 | Zhao | A61L 15/585 |
| 2016/0270961 A1* | 9/2016 | Maitland | A61L 15/26 |

OTHER PUBLICATIONS

Yuk, H. et al. "Dry double-sided tape for adhesion of wet tissues and devices", Nature, Oct. 30, 2019, vol. 575, Nov. 7, 2019, 169-174.*
Li et al. "A Thermo- and Moisture-Responsive Zwitterionic Shape Memory Polymer for Novel Self-Healable Wound Dressing Applications", Macromol Mater Eng 2019, 304, 1800603.*
Gianino, E. et al. "Smart wound dressings for diabetic chronic wounds", Bioengineering, Jun. 26, 2018, 5, 51.*
A. Veves, V. Falanga, D. G. Armstrong, M. L. Sabolinski, S. Apligraf Diabetic Foot Ulcer, Graftskin, a human skin equivalent, is effective in the management of noninfected neuropathic diabetic foot ulcers: a prospective randomized multicenter clinical trial. Diabetes Care 24, 290-295 (2001).
W. A. Marston, J. Hanft, P. Norwood, R. Pollak, The efficacy and safety of Dermagraft in improving the healing of chronic diabetic foot ulcers: results of a prospective randomized trial. Diabetes Care 26, 1701-1705 (2003).
T. J. Wieman, J. M. Smiell, Y. Su, Efficacy and safety of a topical gel formulation of recombinant human platelet-derived growth factor-BB (becaplermin) in patients with chronic neuropathic diabetic ulcers. A phase III randomized placebo-controlled double-blind study. Diabetes Care 21, 822-827 (1998).
F. Tecilazich, T. Dinh, A. Veves, Treating diabetic ulcers. Expert opinion on pharmacotherapy 12, 593-606 (2011).
F. Tecilazich, T. L. Dinh, A. Veves, Emerging drugs for the treatment of diabetic ulcers. Expert opinion on emerging drugs 18, 207-217 (2013).
A. J. Singer, R. A. Clark, Cutaneous wound healing. The New England journal of medicine 341, 738-746 (1999).
I. George Broughton, J. E. Janis, C. E. Attinger, The basic science of wound healing. Plastic and Reconstructive Surgery 117, 12S-34S (2006).
I. George Broughton, J. E. Janis, C. E. Attinger, Wound healing: an overview. Plastic and Reconstructive Surgery 117, 1e-S-32e-S (2006).
G. C. Gurtner, S. Werner, Y. Barrandon, M. T. Longaker, Wound repair and regeneration. Nature 453, 314-321 (2008).
G. C. Gurtner et al., Improving cutaneous scar formation by controlling the mechanical environment: large animal and phase I studies. Annals of Surgery 254, 217-225 (2011).
V. W. Wong et al., A mechanomodulatory device to minimize incisional scar formation. Advances in Wound Care 2, 185-194 (2013).
S. A. Eming, P. Martin, M. Tomic-Canic, Wound repair and regeneration: mechanisms, signaling, and translation. Science translational medicine 6, 265sr266 (2014).
L. A. Barnes et al., Mechanical forces in cutaneous wound healing: emerging therapies to minimize scar formation. Advances in Wound Care 7, 47-56 (2018).
H. I. C. Harn et al., The tension biology of wound healing. Experimental Dermatology 28, 464-471 (2019).
V. Falanga, Wound healing and its impairment in the diabetic foot. Lancet 366, 1736-1743 (2005).

(Continued)

*Primary Examiner* — Gina C Justice
(74) *Attorney, Agent, or Firm* — Nieves IP Law Group, LLC; Peter A. Nieves

(57) ABSTRACT

A shape memory adhesive material for adhering and contracting wounds, particularly diabetic wounds, to facilitate their closure and healing. The shape memory adhesive is pre-stretched and dried to provide an adhesive structure with a pre-programmed strain, wherein the adhesive is capable of rapid robust adhesion followed by predictive contraction upon contact with a wet surface. According to preferred embodiments, the shape memory adhesive material includes a combination of one or more hydrophilic polymers or copolymers, one or more amine coupling group, and one or more cross linkers.

40 Claims, 22 Drawing Sheets

(56) References Cited

OTHER PUBLICATIONS

M. A. Loots et al., Differences in cellular infiltrate and extracellular matrix of chronic diabetic and venous ulcers versus acute wounds. The Journal of investigative dermatology 111, 850-857 (1998).
H. Brem, M. Tomic-Canic, Cellular and molecular basis of wound healing in diabetes. The Journal of clinical investigation 117, 1219-1222 (2007).
J. Li et al., Tough adhesives for diverse wet surfaces. Science 357, 378-381 (2017).
S. Blacklow et al., Bioinspired mechanically active adhesive dressings to accelerate wound closure. Science Advances 5, eaaw3963 (2019).
H. Yuk et al., Dry double-sided tape for adhesion of wet tissues and devices. Nature 575, 169-174 (2019).
F. N. Kelley, F. Bueche, Viscosity and glass temperature relations for polymer-diluent systems. Journal of Polymer Science 50, 549-556 (1961).
H. Frisch, T. Wang, T. Kwei, Diffusion in glassy polymers. II. Journal of Polymer Science Part A-2: Polymer Physics 7, 879-887 (1969).
X. Mao, H. Yuk, X. Zhao, Hydration and swelling of dry polymers for wet adhesion. Journal of the Mechanics and Physics of Solids, 103863 (2020).
D. Upton, K. Solowiej, C. Hender, K. Woo, Stress and pain associated with dressing change in patients with chronic wounds. Journal of Wound Care 21, 53-61 (2012).
G. Han, R. Ceilley, Chronic wound healing: a review of current management and treatments. Advances in Therapy 34, 599-610 (2017).
X. Chen, H. Yuk, J. Wu, C. S. Nabzdyk, X. Zhao, Instant tough bioadhesive with triggerable benign detachment. Proceedings of the National Academy of Sciences, (2020).
C. Flynn, A. Taberner, P. Nielsen, Mechanical characterisation of in vivo human skin using a 3D force-sensitive micro-robot and finite element analysis. Biomechanics and Modeling in Mechanobiology 10, 27-38 (2011).
A. B. Berezovsky et al., Primary contraction of skin grafts: a porcine preliminary study. Plast Aesthet Res Serial Online 25, 22-26 (2015).
H. Joodaki, M. B. Panzer, Skin mechanical properties and modeling: a review. Proceedings of the Institution of Mechanical Engineers, Part H: Journal of Engineering in Medicine 232, 323-343 (2018).
M. C. Darnell et al., Performance and biocompatibility of extremely tough alginate/polyacrylamide hydrogels. Biomaterials 34, 8042-8048 (2013).
M. Martin, Cutadapt removes adapter sequences from high-throughput sequencing reads. EMBnet. Journal 17, 10-12 (2011).
A. Conesa et al., A survey of best practices for RNA-seq data analysis. Genome Biology 17, 13 (2016).
F. Cunningham et al., Ensembl 2019. Nucleic Acids Research 47, D745-D751 (2019).
A. Dobin et al., STAR: ultrafast universal RNA-seq aligner. Bioinformatics 29, 15-21 (2013).
Y. Liao, G. K. Smyth, W. Shi, featureCounts: an efficient general purpose program for assigning sequence reads to genomic features. Bioinformatics 30, 923-930 (2014).
M. I. Love, W. Huber, S. Anders, Moderated estimation of fold change and dispersion for RNA-seq data with DESeq2. Genome Biology 15, 550 (2014).
G. Yu, L.-G. Wang, Y. Han, Q.-Y. He, clusterProfiler: an R package for comparing biological themes among gene clusters. Omics: A Journal of Integrative Biology 16, 284-287 (2012).

\* cited by examiner

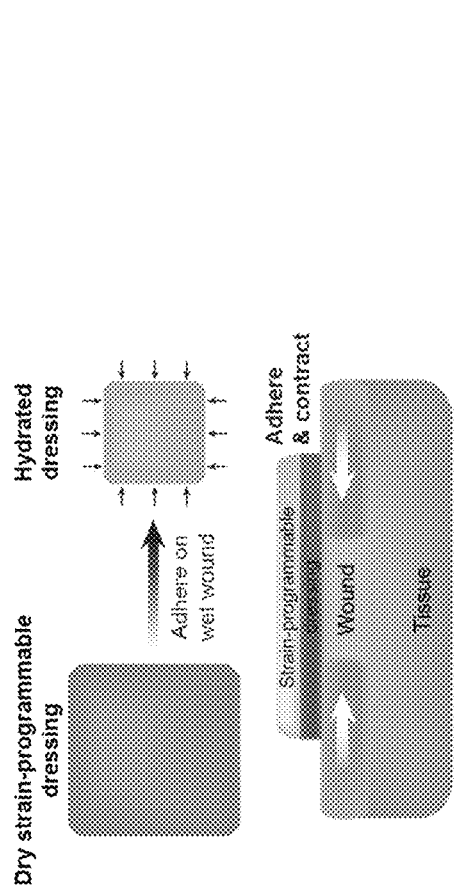
FIG. 1A
FIG. 1B
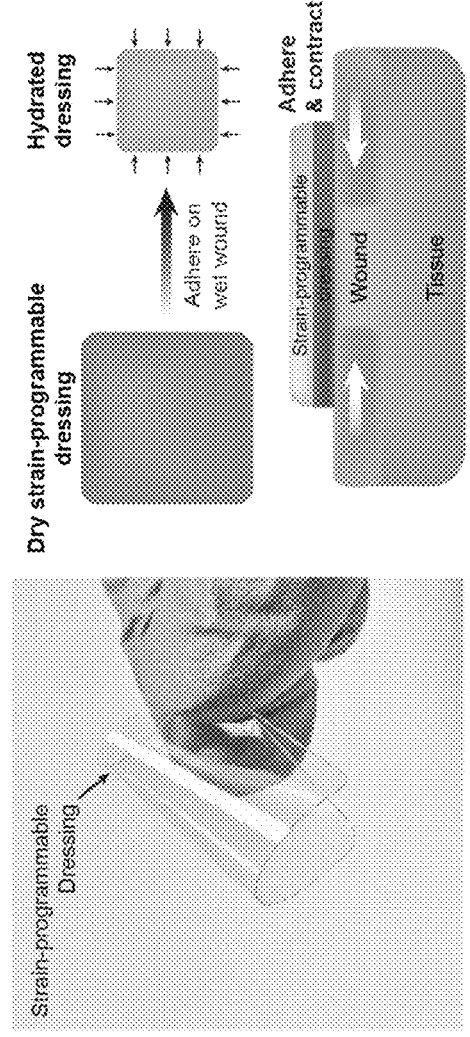
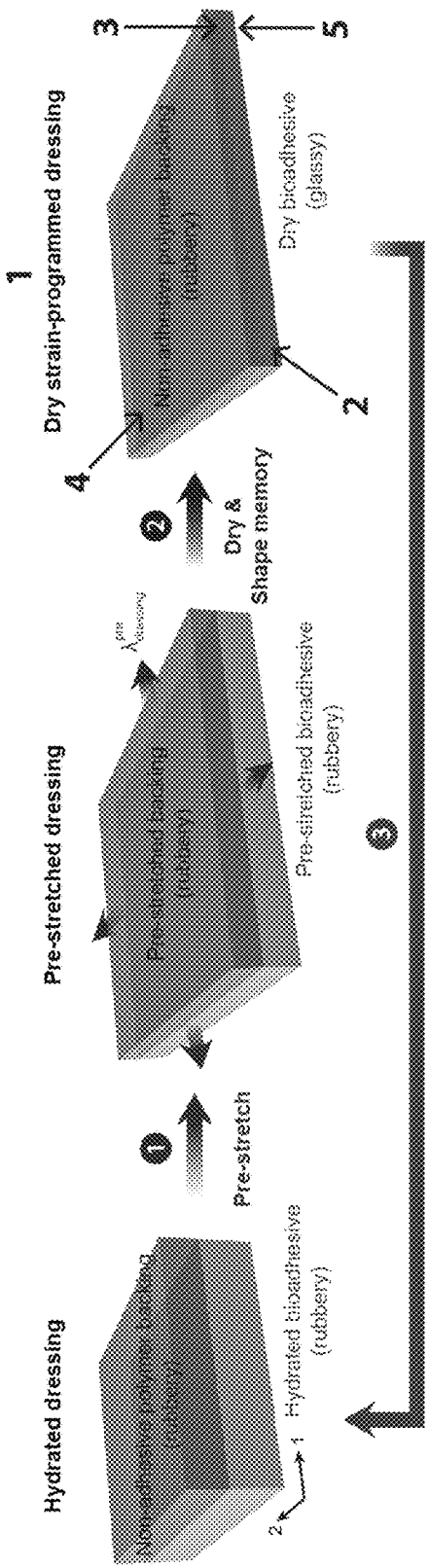
FIG. 1C

FIG. 3A
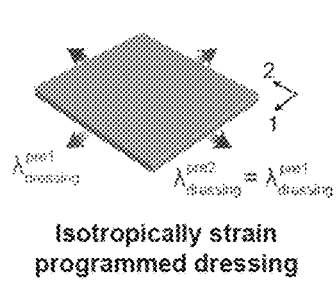
Isotropically strain
programmed dressing
FIG. 3B
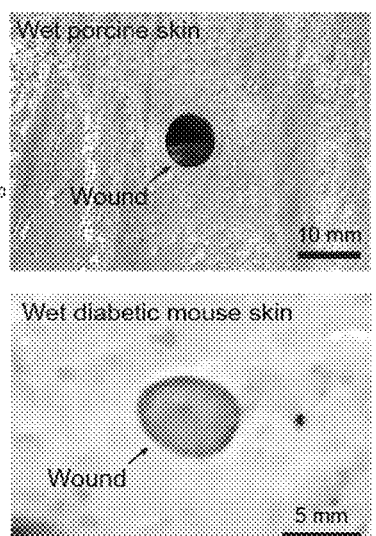
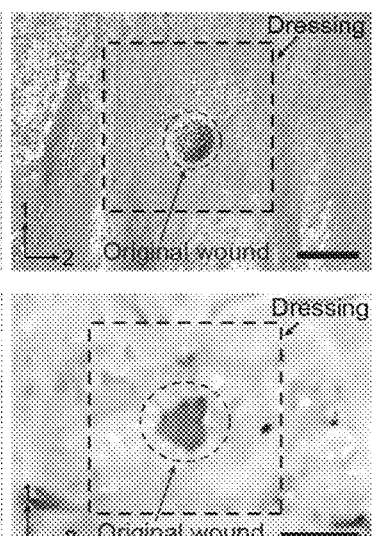
FIG. 3C
FIG. 3D
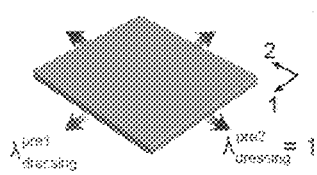
Anisotropically strain
programmed dressing
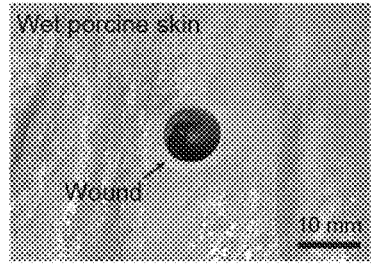
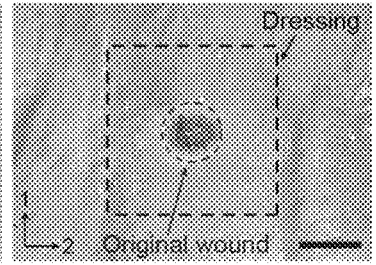
FIG. 3E
FIG. 3F

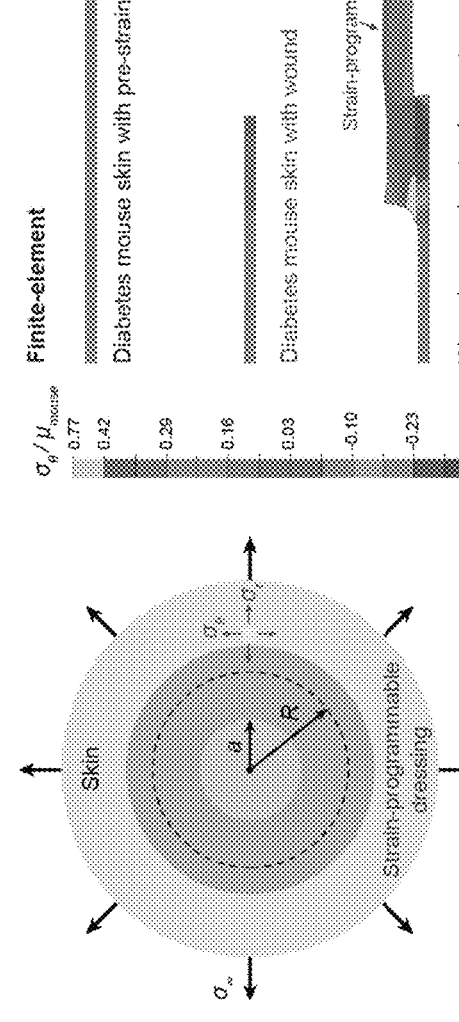
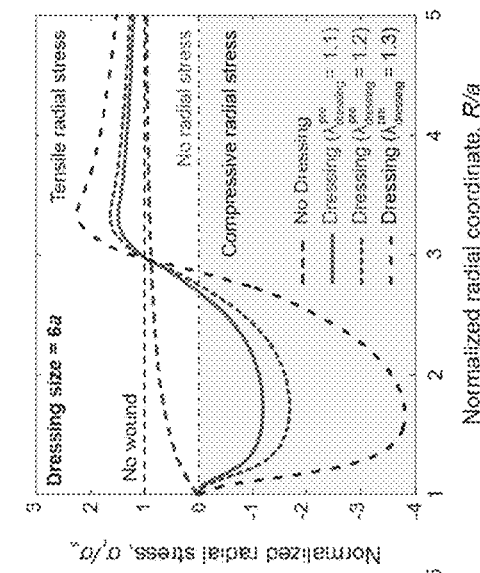
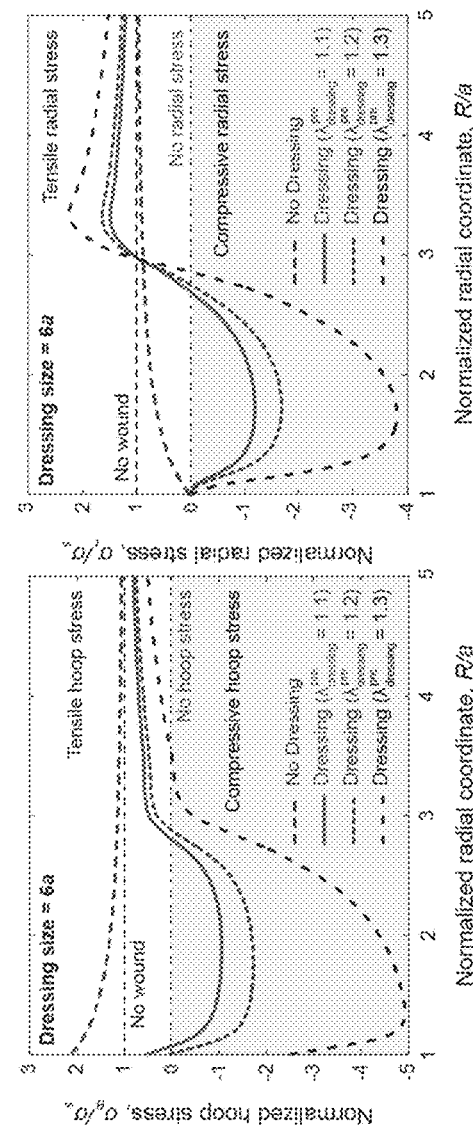
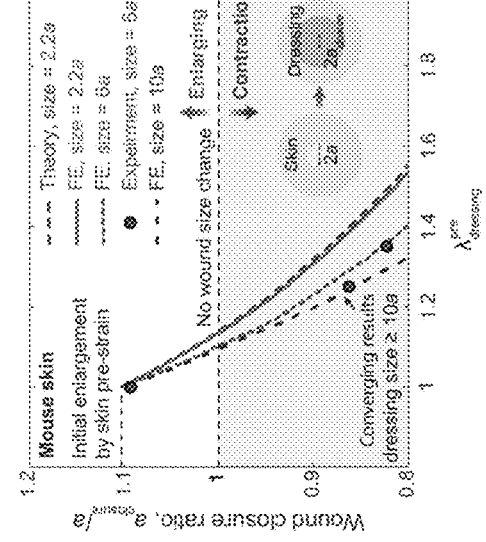
FIG. 5A  FIG. 5B  FIG. 5C
FIG. 5D  FIG. 5E  FIG. 5F

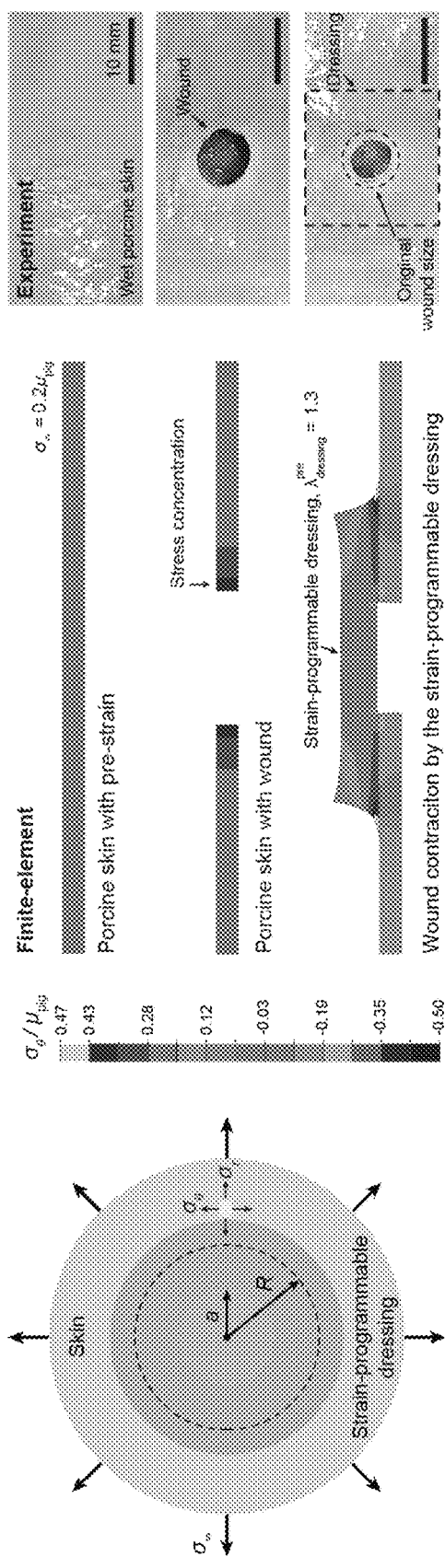

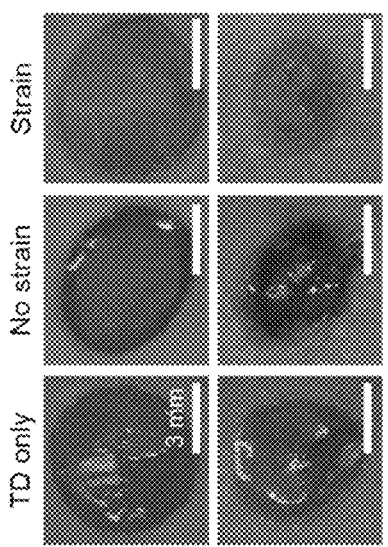
FIG. 8A
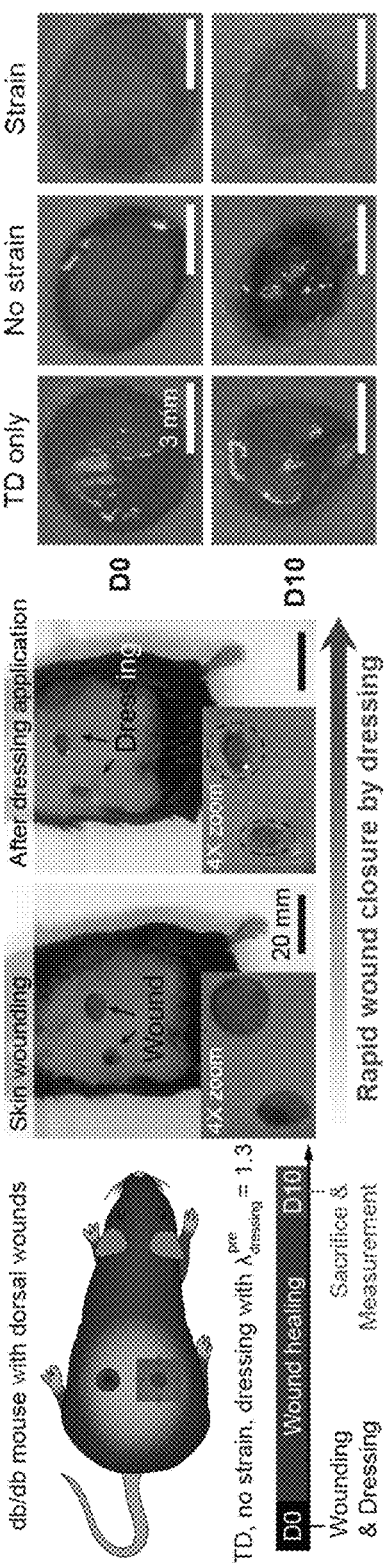
FIG. 8B
FIG. 8C
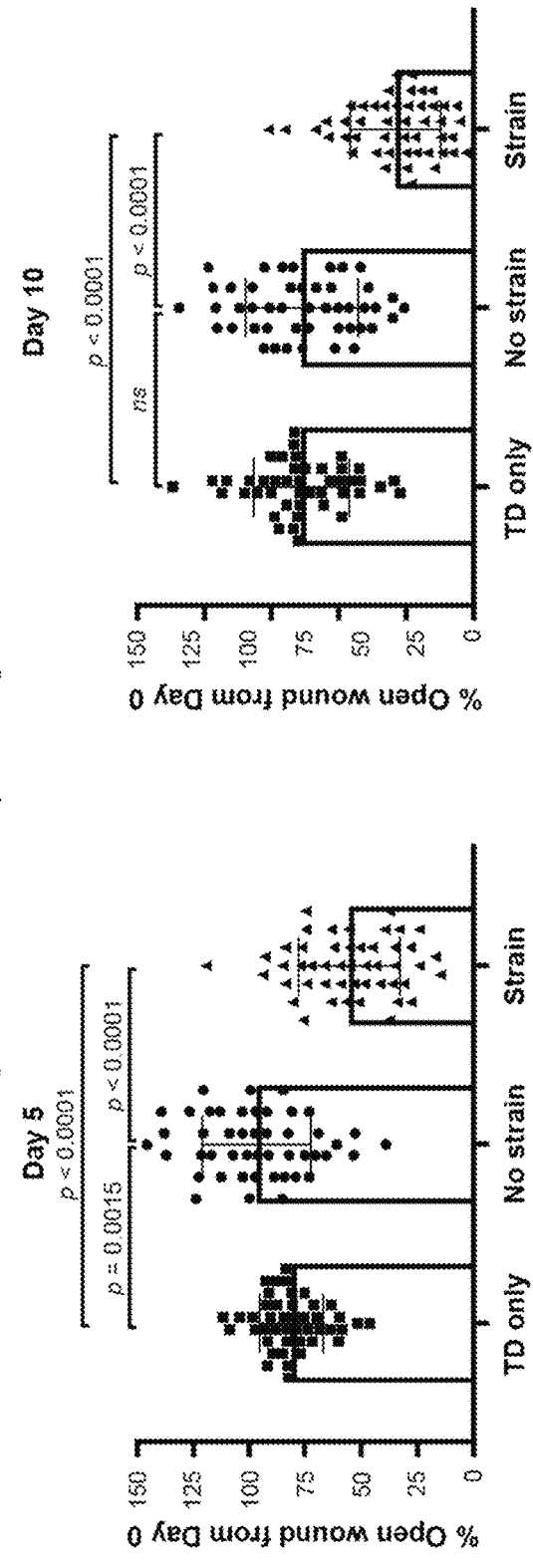
FIG. 8D
FIG. 8E

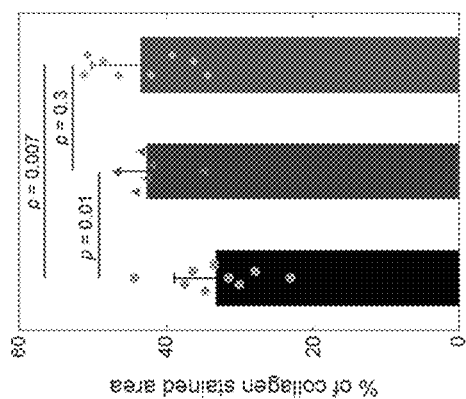
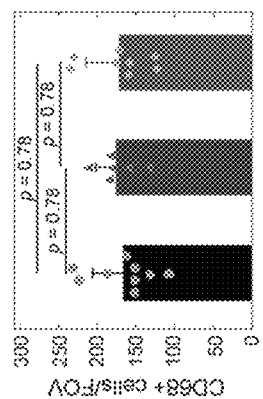
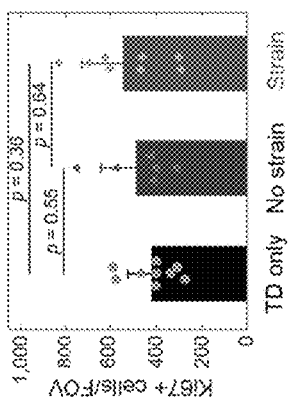
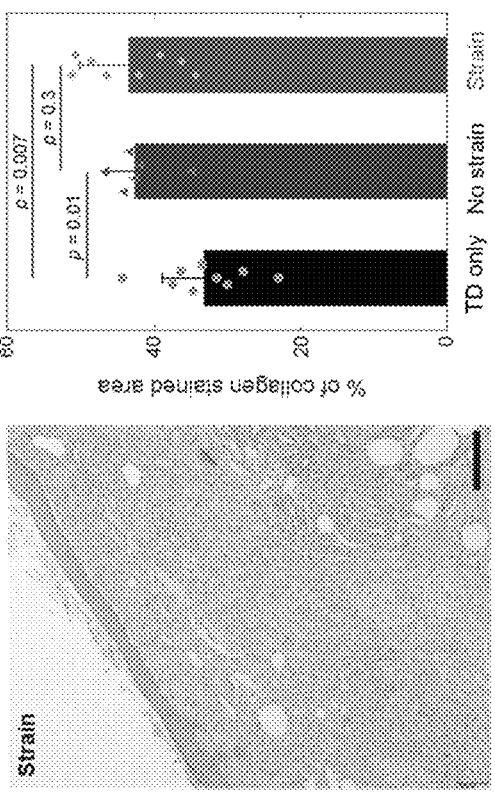
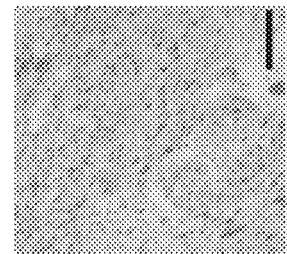
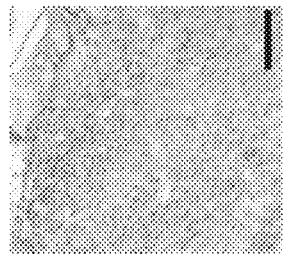
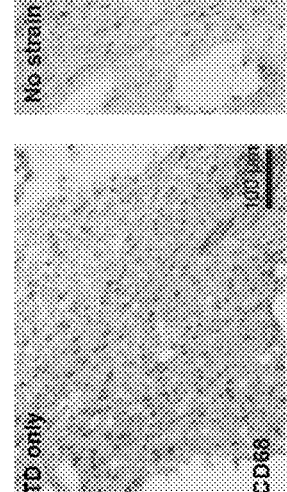
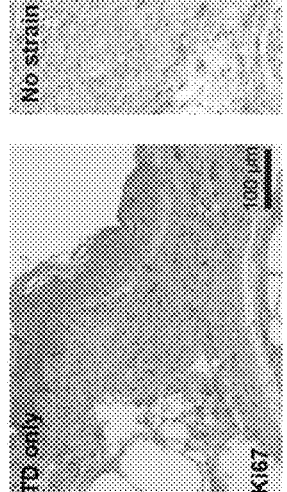

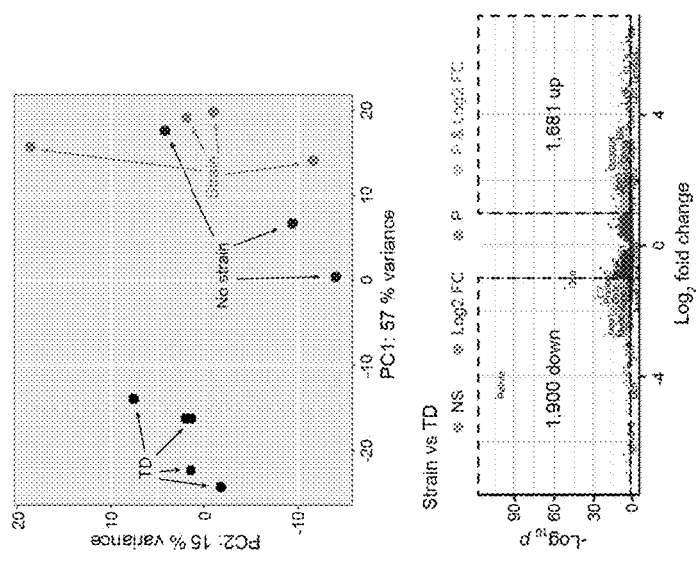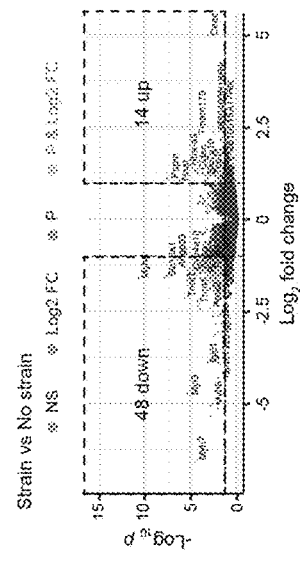

FIG. 11A
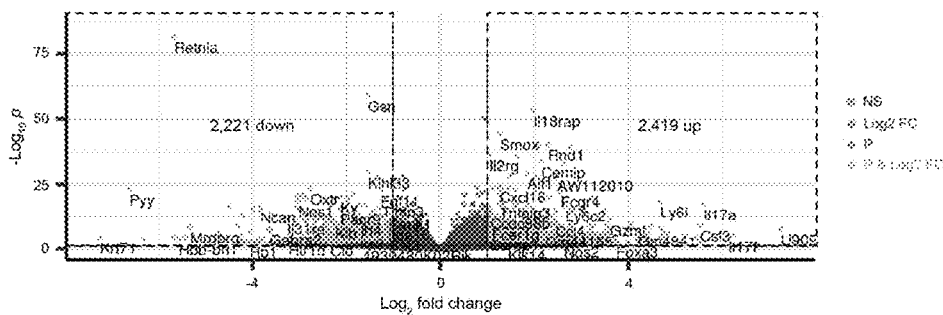
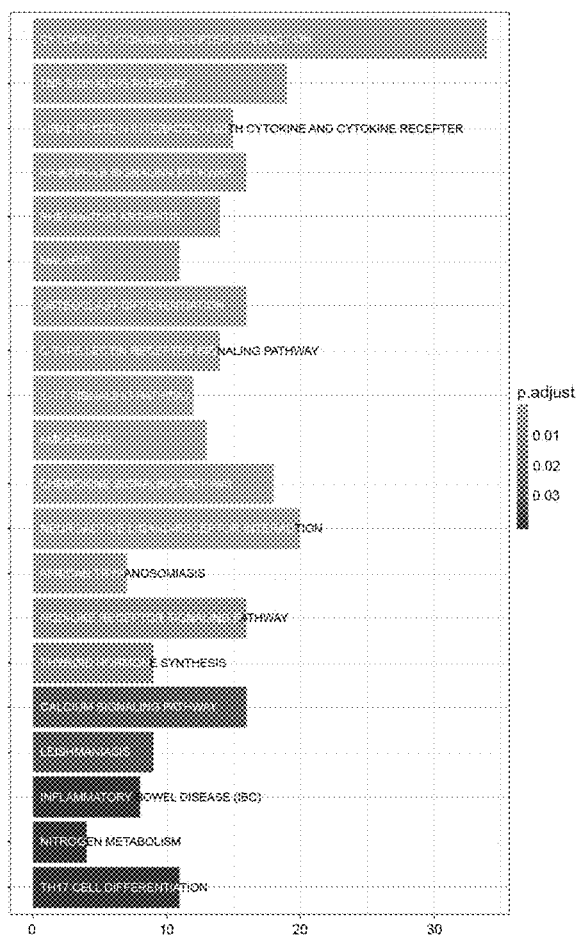
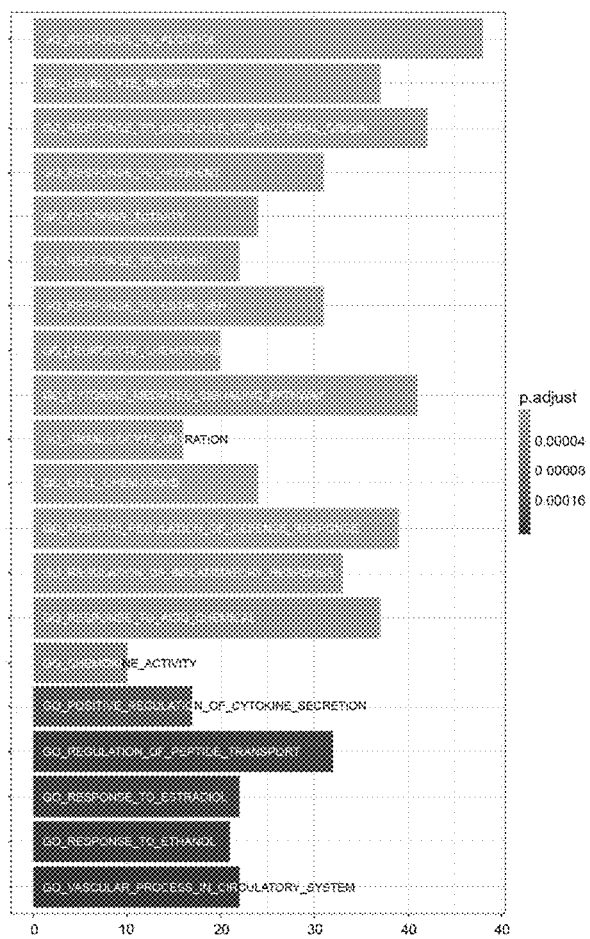
FIG. 11B
FIG. 11C

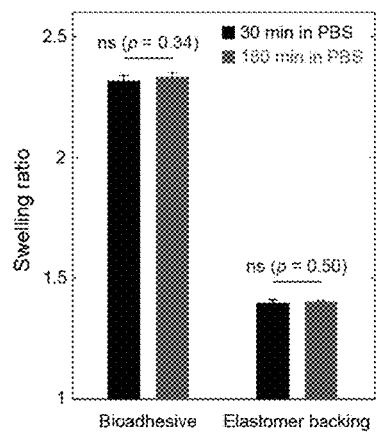
FIG. 13A
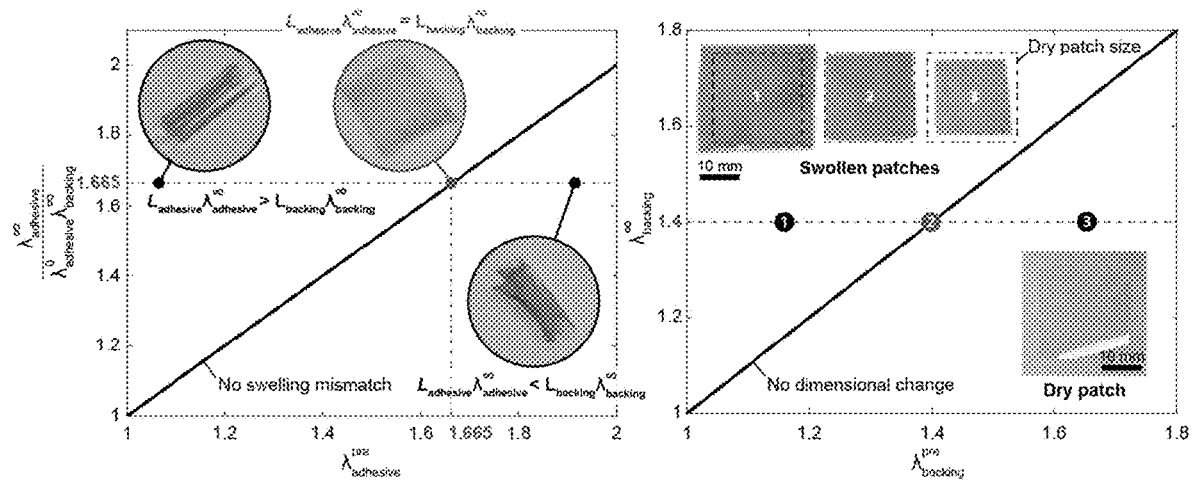
FIG. 13B
FIG. 13C

FIG. 15A 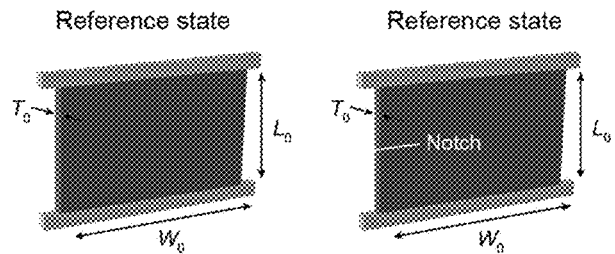 FIG. 15B
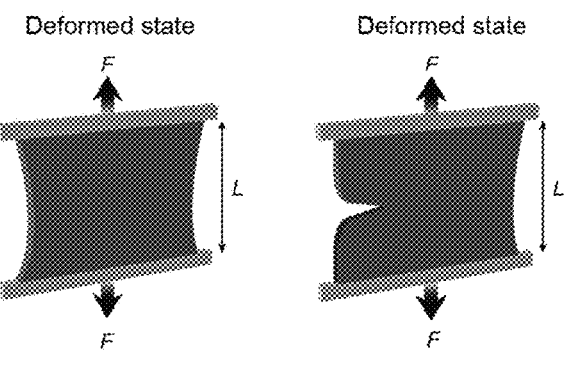
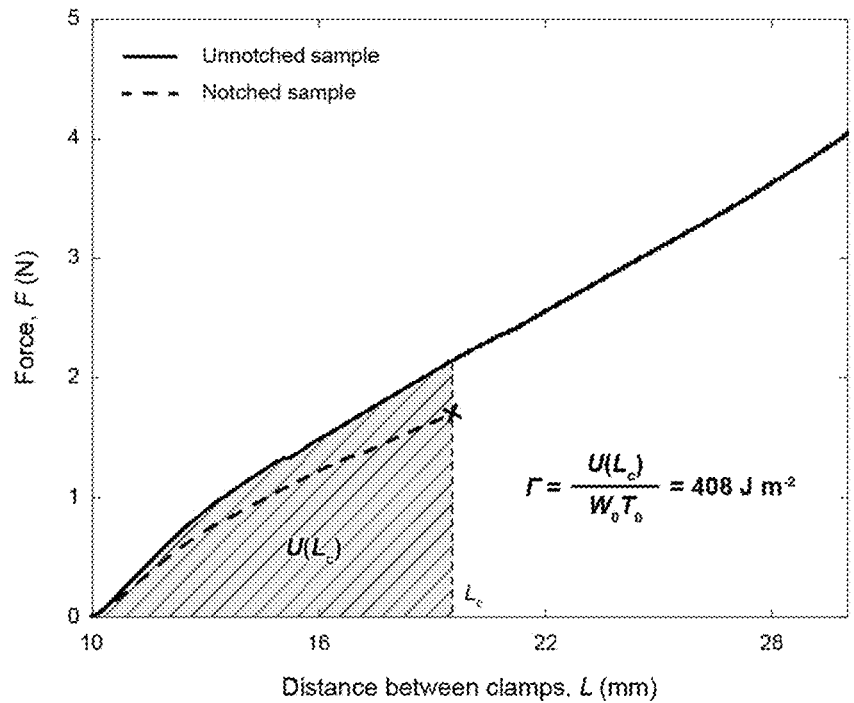
FIG. 15C

FIG. 17A
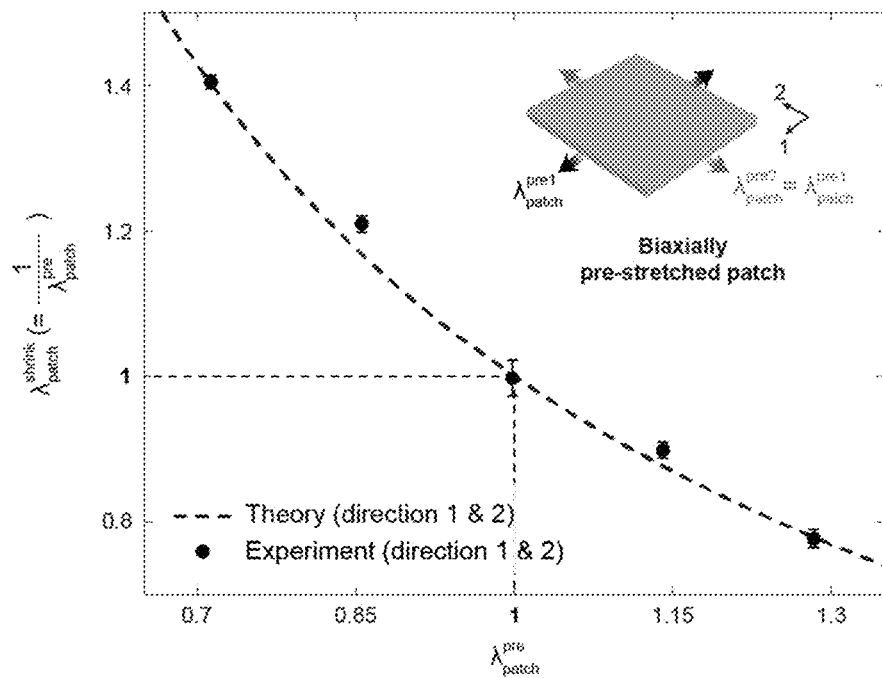
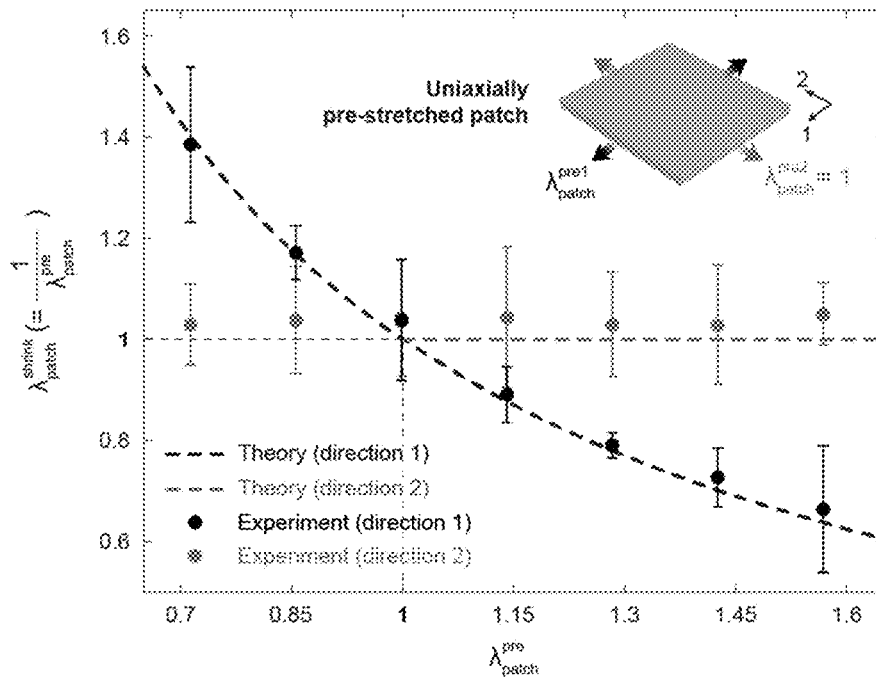
FIG. 17B

FIG. 18A
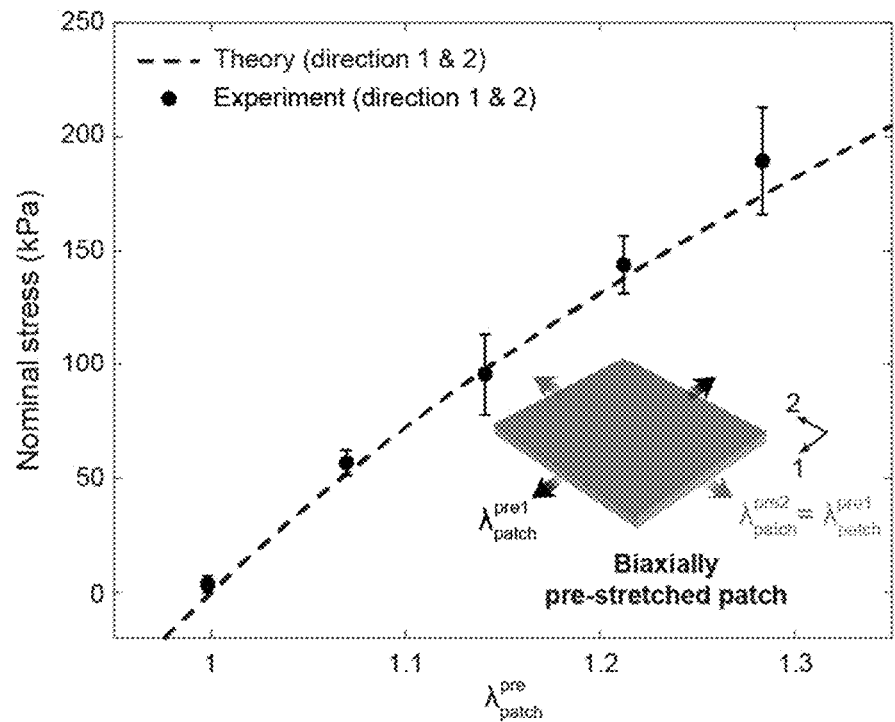
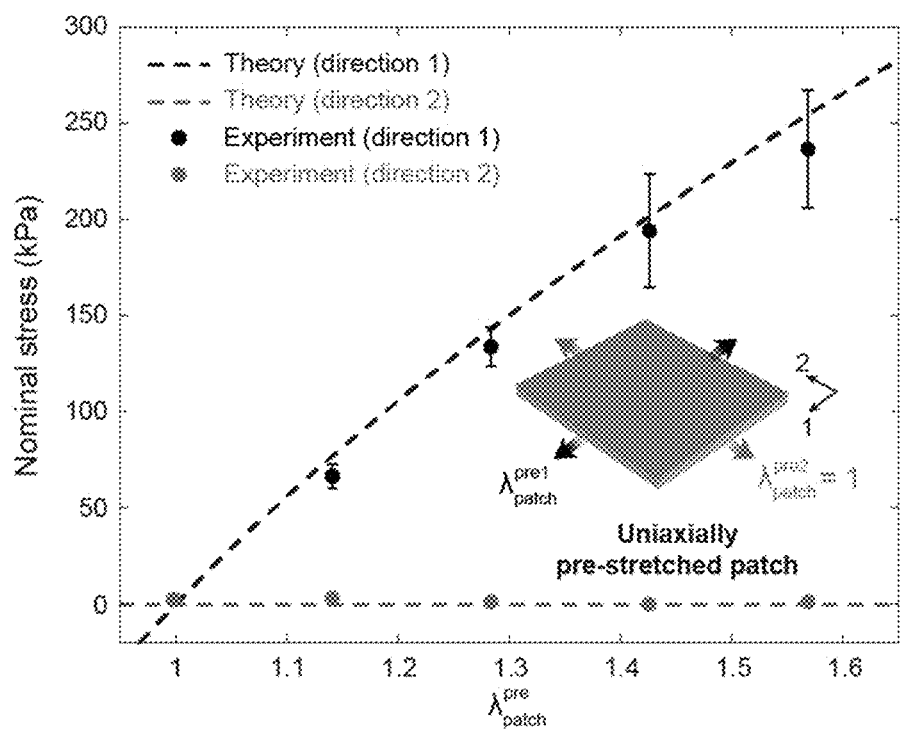
FIG. 18B

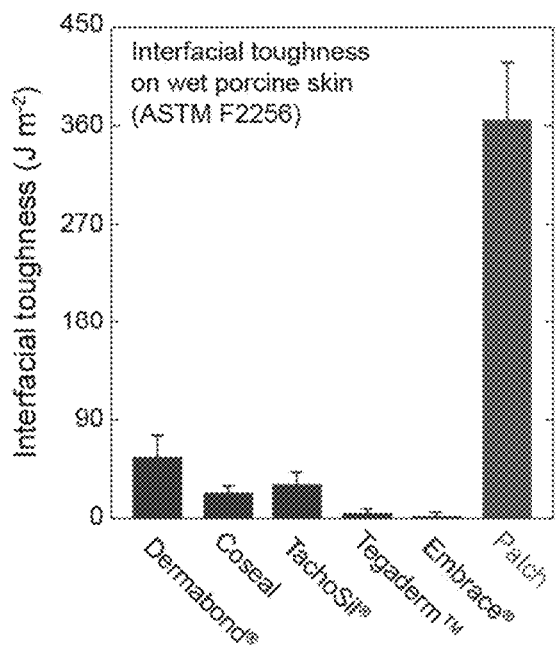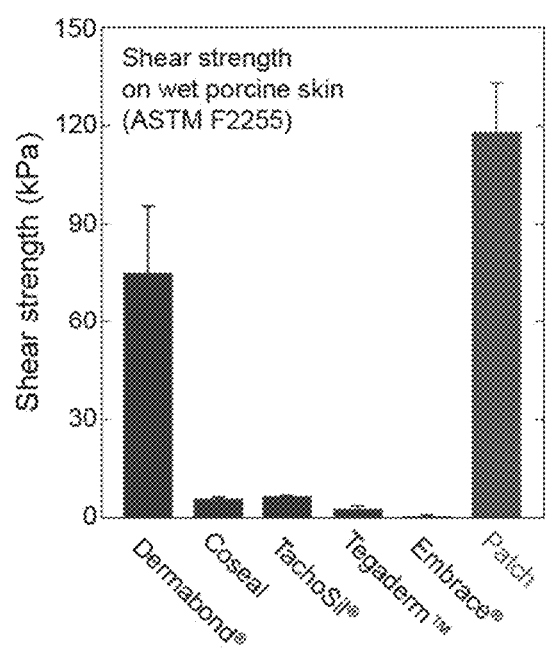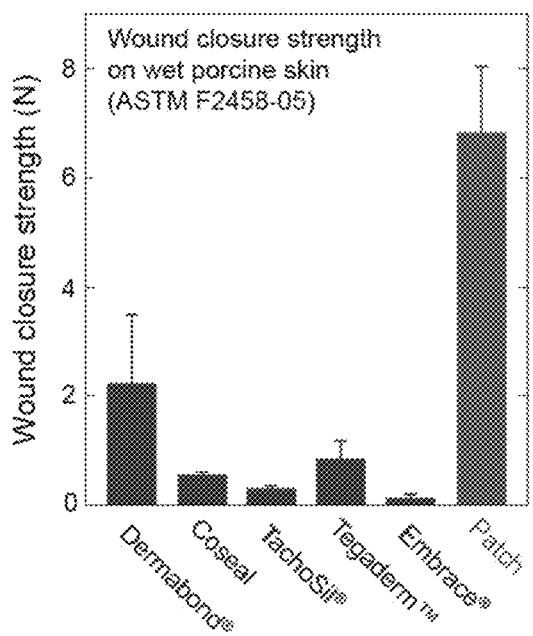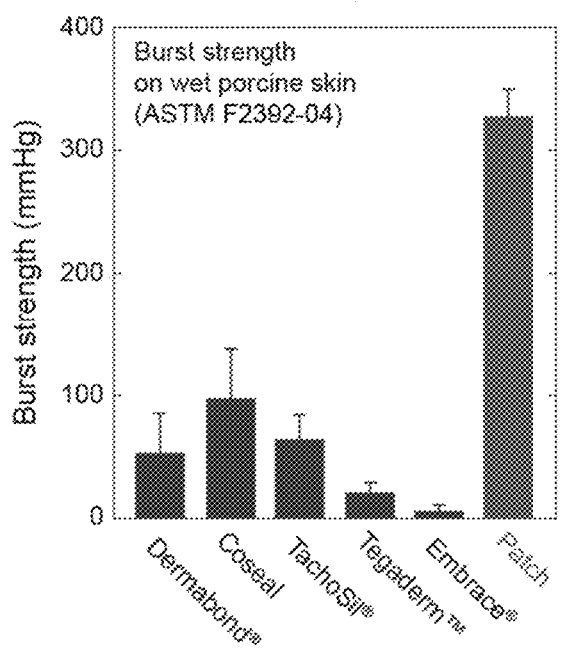

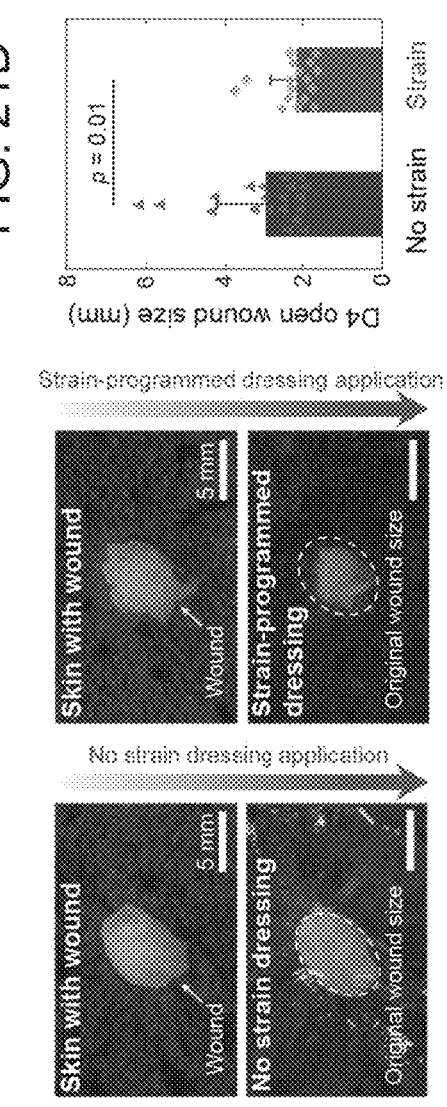
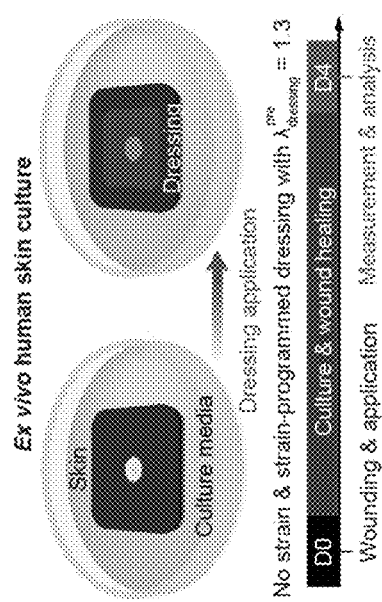
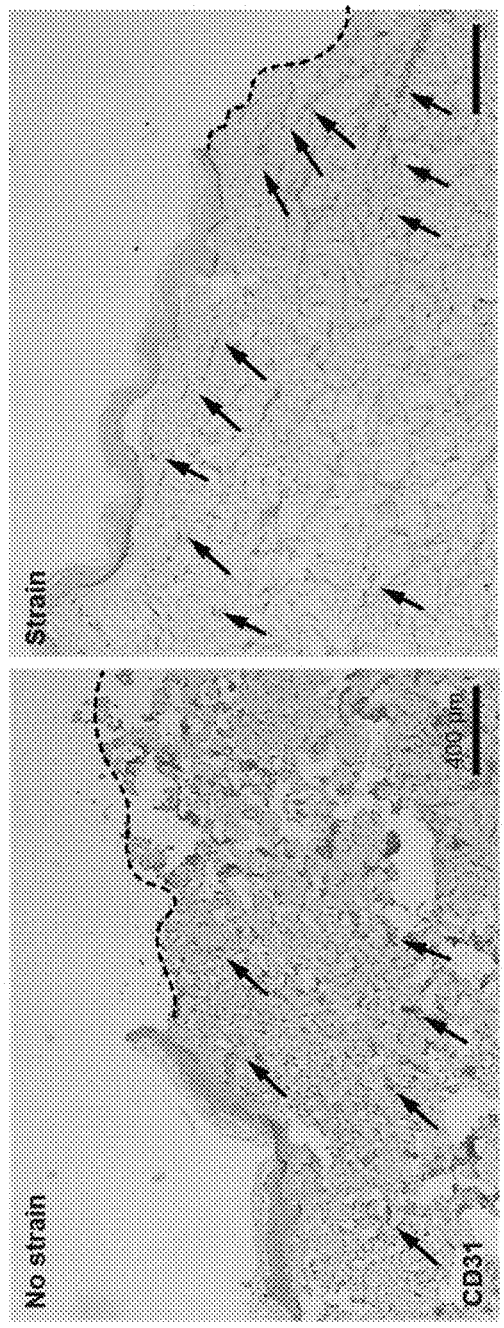

SHAPE MEMORY ADHESIVE MATERIALS FOR DIABETIC WOUND HEALING

CROSS-REFERENCE TO RELATED APPLICATIONS

This application claims the benefit of priority to U.S. Provisional Patent Application No. 63/148,901, entitled SHAPE MEMORY ADHESIVE MATERIALS FOR DIABETIC WOUND HEALING, which was filed on Feb. 12, 2021. The disclosure of the prior application is incorporated by reference herein in its entirety.

STATEMENT OF GOVERNMENT SUPPORT

This invention was made with Government support under Grant No. D20AC00004 awarded by the Defense Advanced Research Projects Agency (DARPA). The Government has certain rights in the invention.

FIELD OF THE INVENTION

The present invention generally relates to materials and methods for adhering and contracting wounds, particularly diabetic wounds, to facilitate their closure and healing. In particular, the present invention provides a shape memory adhesive material that implements a hydration-based adhesion and shape memory mechanism to achieve uniaxial or biaxial contractions of wounds.

BACKGROUND OF THE INVENTION

Impaired wound healing capability and consequent chronic wounds are one of the major and rapid growing complications in patients with diabetes. In particular, diabetic foot problems represent a major complication that significantly impairs the quality of life of diabetic patients, with more than 750,000 new diabetic foot ulcers (DFU) and 70,000 lower extremity amputations per year in the USA alone. Of great concern, after an initial drop, a resurgence of amputations has been noticed the last decade. The cost for the treatment of DFU and amputations in the USA in 2001 was estimated to be 11 billion dollars. Given the rapidly aging population, the increasing number of diabetes patients worldwide, and the deleterious clinical and economic costs including critical reduction in quality of lives, the treatment of diabetic wounds is a major clinical challenge in need of effective solutions. Despite therapeutic strategies that have been introduced and tested for the treatment of DFU over the past few decades, including several skin scaffolds and growth factor-based treatments, their benefits are rather limited with more than 50% of treated DFU patients failing to respond. This lack of effective treatment along with the gravity of the problem highlights the critical importance of developing new therapeutic solutions for diabetic wound healing.

Animal studies have indicated that the reduced contractibility of diabetic wounds compared to non-diabetic wounds is one of the sources of impaired diabetic wound healing. Therefore, mechanical modulation of diabetic wounds presents an attractive approach to accelerate diabetic wound healing. However, the potential therapeutic benefits of the mechanical modulation approach have not been well investigated for diabetic wounds such as DFU due to several technical limitations. Existing wound dressings and bandages for mechanical reinforcement or stimulation lack both the capability to form rapid and robust adhesion on wet wounded skin for extended periods (e.g., days) and the ability to program mechanical contraction of wounds. As such, current wound dressings are limited to passive coverage, provide ineffective and uncontrolled contraction, and fail to provide the ability to fully close wounds. To date, no effective method exists for exerting precisely-controlled and long-term contraction on wet wounded skin.

Thus, further improvements in both adhesive materials and methods of use are greatly needed, particularly as they relate to such adhesive materials and methods that are designed to exert precise contraction on wet-wounded tissue, such as diabetic wounds.

SUMMARY OF THE INVENTION

The present invention provides a shape memory adhesive material that adheres and precisely contracts wounds, particularly diabetic wounds, to facilitate their closure and healing.

According to one aspect, the present invention provides a method of healing a wound comprising applying a dry shape-memory adhesive material to a tissue surface surrounding the wound, the dry-shape-memory adhesive having a dry pre-stretched configuration, the tissue surface having fluid disposed thereon; and allowing the dry pre-stretched shape-memory adhesive material to absorb at least a portion of the fluid and transform to a hydrated rubbery state to trigger (i) hydration-based adhesion to the tissue surface surrounding the wound and (ii) contraction of the shape memory adhesive material from the dry-pre-stretched configuration.

According to another aspect, the present invention provides method of healing a diabetic wound comprising applying a dry shape-memory adhesive material to a tissue surface surrounding the diabetic wound, the dry-shape-memory adhesive having a dry pre-stretched configuration, the tissue surface having fluid disposed thereon; and allowing the dry pre-stretched shape-memory adhesive material to absorb at least a portion of the fluid and transform to a hydrated rubbery state to trigger (i) hydration-based adhesion to the tissue surface surrounding the diabetic wound and (ii) contraction of the shape memory adhesive material from the dry-pre-stretched configuration.

Embodiments according to these aspects can include one or more of the following features. The contraction of the shape memory adhesive material comprises contraction in length and/or width from the pre-stretched configuration and contraction of the tissue surface. The contraction of the tissue surface facilitates closure and healing of the wound. The contraction of the tissue surface provides uniaxial or biaxial contraction of the wound. The contraction of the shape memory adhesive material is predetermined based on a predetermined amount of pre-stretched stored in the dry pre-stretched configuration. The contraction of the tissue mechanically modulates the wound by reducing wound diameter and reducing hoop stress around edges of the wound. A degree of wound diameter reduction and/or hoop stress reduction is based on a relative size of the shape memory adhesive material compared to wound size. Hydration-based adhesion comprises absorbing fluid followed by the formation of physical and covalent crosslinks on the tissue surface. The dry shape-memory adhesive material contains one or more therapeutic agents and the method further comprises allowing the one or more therapeutic agents to release into the tissue surface and/or wound. The dry shape-memory adhesive material comprises one or more hydrophilic polymers, one or more amine coupling groups, and one or more cross linkers. The one or more hydrophilic polymers are selected from polyacrylic acid, polyacrylamide, polyvinyl alcohol, polyhydroxy ethyl methacrylate, polyethylene glycol, poly vinyl pyrrolidone, poly styrene sulfonate, casein, albumin, gelatin, collagen, chitosan, hyaluronic acid, alginic acid, oxidized alginate, pectin, and combinations thereof. The one or more amine coupling groups are selected from N-hydroxysuccinimide ester, N-hydroxysulfosuccinimide ester, aldehyde, imidoester, epoxide, isocyanate, catechol, and combinations thereof. The one or more crosslinkers are selected from gelatin methacrylate, hyaluronic acid methacrylate, oxidized methacrylic alginate, polycaprolactone diacrylate, N,N'-bis(acryloyl) cystamine, N,N'-methylenebis(acrylamide), polyethylene glycol diacrylate, polyethylene glycol dimethacrylate, and combinations thereof. The method further comprises atraumatically detaching the adhered shape memory adhesive from the tissue surface on-demand by applying a biocompatible triggering solution. The wound is a large-area excision wound and the dry shape-memory adhesive material is an isotropically pre-programmed shape memory adhesive material that contracts and mechanically modulates the wound in both lateral and vertical directions. The wound is a narrow incisional wound and the dry shape-memory adhesive material is an anisotropically pre-programmed shape memory adhesive material that contracts and mechanically modulates the wound in a single direction. The method further comprises removing the dry shape-memory adhesive material after 2 or more days, after 5 or more days, after 7 or more days, after 10 or more days, or after 14 or more days. The method further comprises after removing the dry shape-memory adhesive material, applying a second dry shape memory adhesive material to the tissue surface surrounding the wound. The method further comprises after removing the dry shape-memory adhesive material, inspecting the wound and applying a second dry shape memory adhesive material to the tissue surface surrounding the wound if a reduction of wound area is less than about 50%. The second dry shape-memory adhesive has a dry prestretched configuration different than the dry shape-memory adhesive that was removed. The method further comprises after removing the dry shape-memory adhesive material, inspecting the wound and selecting the second dry shape-memory adhesive with a predetermined contraction based on wound inspection. The predetermined contraction of the second dry shape-memory adhesive is different than a predetermined contraction of the dry shape-memory adhesive that was removed. The method further comprises removing the second dry shape-memory adhesive material after about 2 to 14 days, inspecting the wound, and applying a third dry shape memory adhesive material to the tissue surface surrounding the wound if a reduction of wound area is less than about 50%. The method further comprises after removing the second dry shape-memory adhesive material, inspecting the wound and selecting the third dry shape-memory adhesive with a predetermined contraction based on wound inspection. The predetermined contraction of the third dry shape-memory adhesive is different than a predetermined contraction of the second dry shape-memory adhesive.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

FIGS. 1A-C illustrate a shape memory adhesive (dressing) according to an embodiment of the invention photographically (FIG. 1A), and schematics for hydration-based rapid robust tissue adhesion and contraction of the shape memory adhesive on wet wounded tissue (FIG. 1B) and strain programming of a shape memory adhesive material by a hydration-based shape memory mechanism (FIG. 1C).

FIGS. 3A-F schematically illustrate isotropic and anisotropic strain-programmed shape memory adhesives (dressings) according to embodiments of the present invention, FIG. 3A illustrating equal amounts of pre-stretch in length and width directions to provide an isotropic shape memory adhesive, FIGS. 3B-C illustrating the shape memory adhesive of FIG. 3A applied to a circular wound on porcine skin (FIG. 3B) and a diabetic mouse skin (FIG. 3C), FIG. 3D illustrating unequal pre-stretch in length and width directions to provide an anisotropic shape memory adhesive, with FIGS. 3E-F illustrating the shape memory adhesive of FIG. 3D applied to a circular wound on porcine skin (FIG. 3E) and a diabetic mouse skin (FIG. 3F).

FIGS. 5A-F schematically and graphically illustrate the shape memory adhesive (dressing) according to an embodiment of the present invention, with FIG. 5A illustrating the shape memory adhesive as applied to and acting on a wound in diabetic mouse skin, FIGS. 5B-C showing representative finite-element results (FIG. 5B) and corresponding experiment images (FIG. 5C) of the ex vivo diabetic mouse skin with $\lambda_{pressing}^{pre}=1.3$ and shape memory adhesive diameter three times of the wound diameter (shear modulus of the diabetic mice skin is denoted as $\mu_{mouse}$, hoop stress in the diabetic mouse skin as $6a$, and residual stress in the intact diabetic mouse skin as $\sigma_\infty$), FIG. 5D showing finite-element and experimental results for the wound closure ratio as a function of $\lambda_{pressing}^{pre}$ by varying the shape memory adhesive diameter, and FIGS. 5F-E showing finite-element results for the hoop $\sigma_\theta$ (FIG. 5E) and the radial $\sigma_r$ (FIG. 5F) stresses around a wound with the shape memory adhesive with varying $\lambda_{dressing}^{pre}$.

FIGS. 6A-F schematically and graphically illustrate the shape memory adhesive (dressing) according to an embodiment of the present invention, with FIG. 6A illustrating the shape memory adhesive as applied to and acting on a wound in porcine skin, FIGS. 6B-C showing representative finite-element results (FIG. 6B) and corresponding experiment images (FIG. 6C) of the ex vivo porcine skin with $\lambda_{dressing}^{pre}=1.3$ and shape memory adhesive (dressing) diameter three times of the wound diameter (shear modulus of the porcine skin is denoted as $\sigma_\infty$, hoop stress in the porcine skin as $\sigma_\theta$, and residual stress in the intact porcine skin as $\sigma_\infty$), FIG. 6D showing finite-element and experimental results for the wound closure ratio as a function of $\lambda_{dressing}^{pre}$ by varying the diameter of the shape memory adhesive, and FIGS. 6F-E showing finite-element results for the hoop $\sigma_\theta$ (FIG. 6E) and the radial $\sigma_r$ (FIG. 6F) stresses around the wound with the shape memory adhesive with varying $\lambda_{dressing}^{pre}$.

FIGS. 8A-K illustrate representative images of db/db mouse dorsal wounds before (left) and after (right) application of the present invention shape memory adhesive (FIG. 8A), application of the present invention shape memory adhesive (FIG. 8B), representative macroscopic views of wounds on day 0 (D0) and day 10 (D10) for Tegaderm™ (TD) only, a no strain dressing ($\lambda_{dressing}^{pre}=1$), and the present invention shape memory adhesive (strain-programmed $\lambda_{dressing}^{pre}=1.3$)(FIG. 8C), and graphs wound closure data for each of the dressings (dressings were removed before imaging and measurement) on D5 (FIG. 8D) and D10 (FUG. 8E) expressed as % of open wound compared to D0 (values represent the mean and the s.d. (n=44-48), P values were derived from one-way ANOVA with Tukey's post-hoc tests), representative images from D10 wounds with Masson's trichrome stain (MTS)(FIG. 8F)(arrows denoting wound edges; GT: granulation tissue; NE: newly formed epithelium), quantification of re-epithelialization on D10 expressed as % (FIG. 8G), representative images from D10 wounds of the immunohistochemical staining for endothelial marker CD31 (FIG. 8H), quantification of CD31+ vessels per field of view (FOV) on D10 wounds (FIG. 8I), representative images from D10 wounds of the immunohistochemical staining for granulation tissue marker alpha smooth muscle actin (αSMA)(FIG. 8J), and quantification of the αSMA staining on D10 wounds, expressed as % of positively stained area (FIG. 8K) (values in FIGS. 8G,I,K represent the mean and the standard deviation (n=6-12), P values were derived from Kruskal-Wallis tests with Benjamini, Krieger and Yekutieli correction for multiple comparisons).

FIGS. 9A-F illustrate representative images of hematoxylin and eosin (H&E) stained sections of D10 wound tissues (FIG. 9A), graphical quantification of the percentage of collagen stain per wound area from Masson's trichrome stain (FIG. 9B), representative images from D10 wounds of immunohistochemical staining for pan-macrophage marker CD68 (FIG. 9C), graphical quantification of CD68+ cells per field of view (FOV) on D10 wounds (FIG. 9D), representative images from D10 wounds of immunohistochemical staining for proliferation marker Ki67 (FIG. 9E), graphical quantification of Ki67+ cells per field of view (FOV) on D10 wounds. (FIG. 9F), where values in FIGS. 9B,D,F represent the mean and the standard deviation (n=6-9), P-values were derived from Kruskal-Wallis tests with Benjamini, Krieger and Yekutieli correction for multiple comparisons.

FIGS. 10A-G graphically illustrate a principal component analysis (PCA) plot showing variances of a Tegaderm™ (TD) dressing (black dots, n=5), a no strain dressing ($\lambda_{dressing}^{pre}=1$ (blue dots, n=3) and the present invention shape memory adhesive (dressing) ($\lambda_{dressing}^{pre}=1.3$) (red dots, n=4), FIGS. 10B-C show volcano plots displaying gene expression profiles when comparing the present invention shape memory adhesive against TD (FIG. 10B) and the present invention shape memory adhesive against a no strain dressing (FIG. 10C)(data points inside the dotted-line-box represent genes that meet the thresholds of fold change (FC) above 1 or under −1, False Discovery Rate (FDR)<0.05), FIGS. 10D-G illustrate functional over-representation analysis utilizing the top 500 differentially expressed genes results for the present invention shape memory adhesive vs. TD and present invention shape memory adhesive vs. a no strain dressing in gene ontology (GO) (FIGS. 10D,F) and Reactome (FIGS. 10E,G) databases (the x-axis corresponds to the number of genes implicated in each pathway and the grayscale bars (light to dark) correlates with the adjusted p-values as shown in the legends).

FIGS. 11A-C illustrate a volcano plot displaying gene expression profile (FIG. 11A) (data points inside the dotted-line-box represent genes that meet the thresholds of fold change (FC) above 1 or under −1, False Discovery Rate (FDR)<0.05), and functional over-representation analysis utilizing the top 500 differentially expressed genes results in Reactome (FIG. 11B) and gene ontology (GO) (FIG. 11C) databases (the x-axis corresponds to the number of genes implicated in each pathway and the grayscale bars (light to dark) correlates with the adjusted p-values as shown in the legends).

FIGS. 13A-C graphically illustrate swelling of a shape memory adhesive patch according to embodiments of the present invention, where FIG. 13A illustrates swelling ratios of an elastomer backing layer and a bioadhesive layer in a wet physiological environment, FIG. 13B illustrates swelling mismatch canceling between an elastomer backing layer and bioadhesive layer in a shape memory bioadhesive patch, and FIG. 13C illustrates swelling canceling of a shape memory bioadhesive patch. Values in a represent the mean and the standard deviation (n=4). P values are determined by a Student's t test; ns, not significant.

FIGS. 14A-D illustrate the mechanical properties of a shape memory bioadhesive patch according to embodiments of the present invention, wherein FIGS. 14A-B show images of a dry shape memory bioadhesive patch (FIG. 14A) and a swollen shape memory bioadhesive patch (FIG. 14B), and FIG. 14C-D graphically illustrate nominal stress vs. stretch curves for a dry shape memory bioadhesive patch (FIG. 14C) and a swollen shape memory bioadhesive patch (FIG. 14D).

FIGS. 15A-C illustrate fracture toughness of shape memory bioadhesive patch according to an embodiment of the present invention, wherein FIGS. 15A-B schematically illustrate pure-shear tests for an unnotched sample (FIG. 15A) and a notched sample. (FIG. 15B), and FIG. 15C graphically illustrate force vs. distance between clamps for the unnotched and notched swollen shape memory bioadhesive patches for fracture toughness measurement. $L_c$ indicates the critical distance between the clamps at which the notch turns into a running crack. The measured fracture toughness of the shape memory bioadhesive patch is 408 J m$^{-2}$.

FIGS. 17A-B graphically illustrate the predictable mechanical contraction of the shape memory bioadhesive patch according to embodiments of the present invention, where FIG. 17A shows theoretical and experimental values of $\lambda_{patch}^{shrink}$ vs. $\lambda_{patch}^{pre}$ for isotropically shape memory bioadhesive patches, and FIG. 17B shows theoretical and experimental values of $\lambda_{patch}^{shrink}$ vs. $\lambda_{patch}^{pre}$ for anisotropically shape memory bioadhesive patches. Values represent the mean and the standard deviation (n=4).

FIGS. 18A-B graphically illustrate contractile stress generated by shape memory bioadhesive patches according to embodiments of the present invention, wherein experimental and theoretical values for the nominal contractile stress vs. $\lambda_{patch}^{pre}$ generated by the isotropically (FIG. 18A) and the anisotropically (FIG. 18B) strain programmed shape memory bioadhesive patches. Values represent the mean and the standard deviation (n=4).

FIGS. 19A-D schematically illustrate mechanical testing setups for evaluation of adhesion performance, wherein FIG. 19A illustrates a testing setup for interfacial toughness measurements based on the standard 180-degree peel test (ASTM F2256), FIG. 19B illustrates a testing setup for shear strength measurements based on the standard lap-shear test (ASTM F2255), FIG. 19C illustrates a testing setup for wound closure strength measurements based on the standard tensile test (ASTM F2458-05), and FIG. 19D illustrates a testing setup for burst strength measurements based on the standard tensile test (ASTM F2392-04).

FIGS. 20A-D graphically illustrate adhesion performance of a shape memory bioadhesive patch according to embodiments of the present invention, wherein FIG. 20A shows interfacial toughness, FIG. 20B shows shear strength, FIG. 20C shows wound closure strength, and FIG. 20D shows burst strength of the shape memory bioadhesive patch on wet porcine skin. Values represent the mean and the standard deviation (n=4).

FIGS. 21A-F illustrate a schematic for a study design, images of a no strain dressing (FIG. 21B) and a shape memory adhesive of the present invention (strain) (FIG. 21C) applied on ex vivo human skin with a circular wound, quantification of an open wound on Day 4 post-injury (FIG. 21D), representative images of CD31 staining for no strain (left) and strain (right) conditions (FIG. 21E), and quantitation of CD31+ structures within the wounds, where arrows in FIG. 21E denote blood vessels and dotted lines indicate non re-epithelialized wounds, values in FIGS. 21D,F represent the mean and the s.d. (N=3 subjects; n=14-20 wounds), P values were derived from unpaired t-tests.

DETAILED DESCRIPTION

Figure 2A:
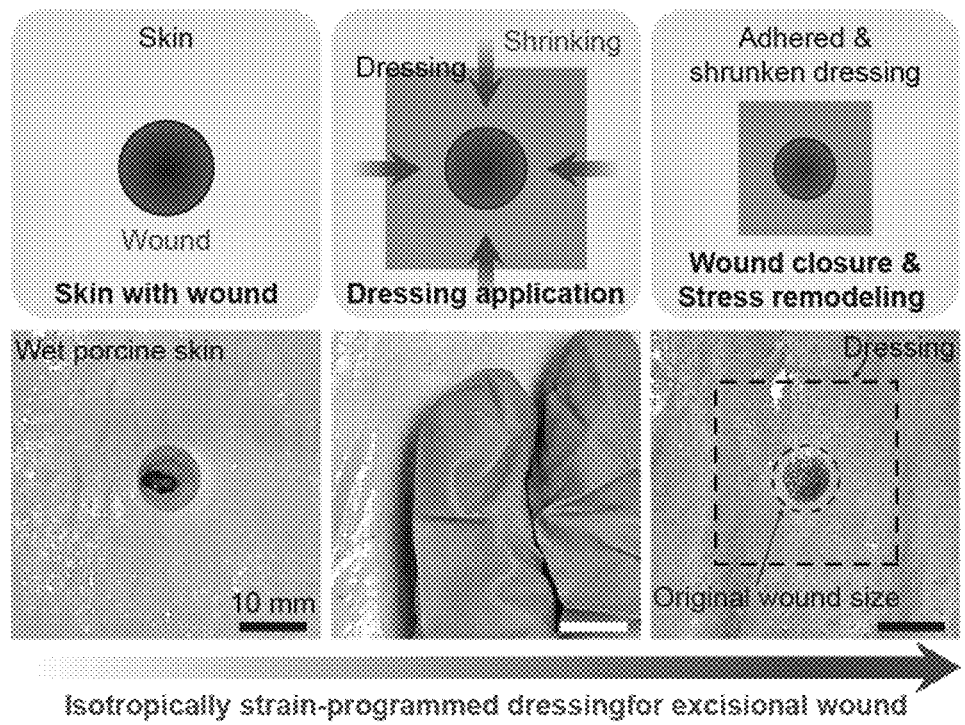
FIGS. 2A-B schematically illustrate application of shape memory adhesives (dressings) according to embodiments of the present invention for closure of a circular wound in a porcine skin by an isotropic shape memory adhesive (FIG. 2A), and closure of an incisional wound in a porcine skin by an anisotropic shape memory adhesive (FIG. 2B)

The following definitions are useful for interpreting terms applied to features of the embodiments disclosed herein, and are meant only to define elements within the disclosure.

As used herein, the term "shape memory adhesive material" refers to a single or multi-layered shape memory adhesive material and which includes at least an adhesive layer. The "shape memory adhesive material" may include one or more non-adhesive backing layers disposed on one or more surfaces of the adhesive layer. The "shape memory adhesive material" may be in the form of a film, patch, tape, strip, sheet, dressing, or the like, and, as such, may be referred to interchangeably as a "shape memory adhesive patch", a "shape memory adhesive tape", a "shape memory adhesive film", a "shape memory adhesive strip", a "shape memory adhesive sheet", "shape memory dressing", etc. depending on its form.

As used herein, the term "patch", "tape", "film", "strip", and "sheet", when describing the adhesive material of the present invention refers to a structure that has a relatively large area as compared to thickness. Such a structure provides flexibility, which can be particularly beneficial when applied to surfaces which move, bend, stretch, twist, etc. such as various tissue surfaces of a living body.

As used herein, the terms "pre-programmed strain" and "strain-programmed", when describing the shape memory adhesive material or dressing of the present invention refers to the shape memory adhesive material which has been fabricated so as to hold a pre-determined amount of stretch/ strain that results in a predictive contraction of the shape memory adhesive material upon contact with and absorption of fluid.

As used herein, the term "dry" when describing the adhesive material, the adhesive layer, and the non-adhesive backing layer of the present invention refers to a material or layer that is below the equilibrium moisture content of the material or layer in use. As such, when a dry adhesive material, a dry adhesive layer, and a dry non-adhesive backing layer of the present invention are placed in contact with fluid, such as a wet tissue or other wet or wetted (e.g., wetted by saline) surface to which it will adhere, the dry adhesive material, dry adhesive layer, and dry non-adhesive backing layer will absorb the fluid (e.g., water, saline, moisture, and physiological body fluids such as blood plasma, interstitial fluid, lymphatic fluid, cerebrospinal fluid, and gastrointestinal fluid) from the wet or wetted surface. Generally, a dry adhesive material, dry adhesive layer, and dry non-adhesive backing layer will have less than about 50% by weight of liquid components based on total weight of the dry material or layer.

As used herein, the term "rubbery" when used to describe states of the adhesive layer and non-adhesive backing layer of the present invention refers to materials having mechanical properties and behaviors of elastomeric rubbers, such as low Young's modulus, elastic recovery after release (or removing) of stretch, etc.

As used herein, the term "glassy" when used to describe states of the adhesive layer and non-adhesive backing layer of the present invention refers to materials having mechanical properties and behaviors that of plastics, such as high Young's modulus, and plastic deformation after release (or removing) of stretch, etc.

As used herein, the term "absorb" when describing the mechanism by which the dry adhesive material, dry adhesive layer, and dry non-adhesive backing layer absorb fluid (e.g., water, saline, moisture, and physiological body fluids such as blood plasma, interstitial fluid, lymphatic fluid, cerebrospinal fluid, and gastrointestinal fluid) from a wet surface in which it is placed in contact with, refers to atoms or molecules from the fluid entering the dry adhesive material, dry adhesive layer, and dry non-adhesive backing layer.

As used herein, the term "body fluid" refers to aqueous physiological fluids including blood, saliva, gastrointestinal fluid, lymphatic fluid, cerebrospinal fluid, gastrointestinal fluid, and mucus.

As used herein, the terms "wet surface" and "wet tissue" refers to a surface, including biological tissue, that contains or is covered with fluid including water, saline, moisture, and physiological body fluids such as blood plasma, saliva, mucus, interstitial fluid, lymphatic fluid, cerebrospinal fluid, and gastrointestinal fluid.

As used herein, the term "covered", when used to describe the surface to which the adhesive material is applied as being "covered" with fluid, refers to a surface that is partially or completely covered with fluid. As such, "covered" can include a configuration in which an entire layer of fluid is disposed on the surface that the adhesive material is applied to such that, upon application of the adhesive material, a layer of fluid separates the entire adhesive material from the surface. "Covered" can also include a configuration in which only a portion (less than 100% but generally greater than 50%) of a surface to which the adhesive material is applied has a layer of fluid disposed therein, such that one or more portions of the adhesive material are separated from the surface by the fluid and one or more portions of the adhesive material are in direct contact with the surface.

As used herein, "swelling" when used to describe the pre-stretched dry adhesive material, pre-stretched dry adhesive layer, and pre-stretched dry non-adhesive backing layer refers to absorption of fluid by the pre-stretched dry adhesive material, pre-stretched dry adhesive layer, and pre-stretched dry non-adhesive backing layer and swelling upon contact with the fluid and/or one or more wet surfaces. Such "swelling" generally refers to an increase in water contents and the subsequent increase in total volume by the pre-stretched dry adhesive material, pre-stretched dry adhesive layer, and pre-stretched dry non-adhesive backing layer.

As used herein, the term "contraction", when used to describe the pre-stretched dry adhesive material, pre-stretched dry adhesive layer, and/or pre-stretched non-adhesive backing layer refers to a decrease in size in the length and/or width directions upon absorption of fluid by the pre-stretched dry adhesive material, pre-stretched dry adhesive layer, and pre-stretched dry non-adhesive backing layer.

As used herein, the terms "rapid and predictive contraction" and "predictable mechanical contraction", when used to describe the shape memory adhesive material itself as well as the effect of the shape memory adhesive on one or more target surfaces refers to contraction that is "rapid" in that it occurs within about 3 minutes, preferably within less than about 1 minute; and that is "predictable" in that the amount of contraction in size is achievable within about 20% error from the prescribed predicted change in size, preferably within about than 10% error from the prescribed predicted change in size, particularly within less than 10% error from the prescribed predicted change in size As used herein, the term "bioadhesive" when used to describe the dry bioadhesive material refers the capability of the material to form adhesion on the surface of biological tissues.

As used herein, "biodegradable" when used to describe the adhesive material refers the decomposition and/or subsequent removal of the adhesive material in part or whole within a living animal by the endogenous enzymes and/or water inside the animal.

As used herein, the term "instant" when used to describe the instant temporary physical crosslinks between the adhesive material and one or more target surfaces refers to a time elapse from the instant that the adhesive material makes contact with the one or more target surfaces of greater than zero seconds and up to or within about one minute, more preferably less than or equal to about 50 seconds, more preferably less than or equal to about 40 seconds, more preferably less than or equal to about 30 seconds, more preferably less than or equal to about 20 seconds, more preferably less than or equal to about 15 seconds, more preferably less than or equal to about 10 seconds, more preferably less than or equal to about 9 seconds, more preferably less than or equal to about 8 seconds, more preferably less than or equal to about 7 seconds, more preferably less than or equal to about 6 seconds, and more preferably less than or equal to about 5 seconds.

As used herein, the term "temporary" when used to describe the instant temporary physical crosslinks between the adhesive material and one or more target surfaces refers to a time range extending between time at which the instant temporary physical crosslinks form and a sufficiently long time such as over 24 hours after which the instant temporary physical crosslinks form.

As used herein, "rapid" or "quick" when used to describe the fast covalent crosslinking between the adhesive material and one or more target surfaces refers to a time elapse from the instant that the adhesive material makes contact with the one or more target surfaces of greater than zero seconds and up to and including 5 minutes, more preferably less than or equal to about 4.5 minutes, more preferably less than or equal to about 4 minutes, more preferably less than or equal to about 3.5 minutes, more preferably less than or equal to about 3 minutes, more preferably less than or equal to about 2.5 minutes, more preferably less than or equal to about 2 minutes, more preferably less than or equal to about 1.5 minutes, and more preferably less than or equal to about 1 minute.

As used herein, the term "physical crosslinks", when used to describe the interaction between the adhesive material and the one or more target surfaces whose adhesion is sustained by one or more types of physical interactions including but not limited to hydrogen bonds, electrostatic bonds, van der Waals interactions, π-π bonds, and hydrophobic interactions.

As used herein, the term "covalent crosslinks", when used to describe the interaction between the adhesive material and the one or more target surfaces whose adhesion is sustained by one or more types of covalent chemical bonds including but not limited to carbon-carbon bonds, carbon-nitrogen bonds, carbon-oxygen bonds, carbon-sulfide bonds, and silicon-oxygen bonds.

As used herein, the term "rapid", when used to describe the rapid adhesion provided by the adhesive material, refers to a time greater than zero seconds and up to and including 5 minutes, more preferably less than or equal to about 4.5 minutes, more preferably less than or equal to about 4 minutes, more preferably less than or equal to about 3.5 minutes, more preferably less than or equal to about 3 minutes, more preferably less than or equal to about 2.5 minutes, more preferably less than or equal to about 2 minutes, more preferably less than or equal to about 1.5 minutes, and more preferably less than or equal to about 1 minute. This time is measured from the instant that the adhesive material is applied to the target surface and gentle pressure applied to the time that the adhesive material is adhered. The formation of the adhesion can be experimentally determined by a simple pulling test and visual inspection, wherein the adhesive material does not separate from the target surface when pulled.

As used herein, the term "gentle", when used to describe the pressure applied to the adhesive material, refers to a pressure of no greater than about 50 kPa, for example ranging from about 1 kPa to about 50 kPa. For example, a gentle pressure would refer to a pressure of no greater than about 45 kPa, no greater than about 40 kPa, no greater than about 35 kPa, no greater than about 30 ka, no greater than about 25 kPa, no greater than about 20 kPa, no greater than about 15 kPa, no greater than about 10 kPa, no greater than about 8 kPa, no greater than about 6 kPa, no greater than about 5 kPa, no greater than about 4 kPa, no greater than about 3 kPa, no greater than about 2 kPa, and even as low as about 1 kPa. According to an exemplary embodiment, a suitable gentle pressure is about 10 kPa.

As used herein, the term "tough", when describing the adhesion formed by the adhesive material, refers to an interfacial toughness of at least about 100 J m$^{-2}$, 120 J m$^{-2}$, 140 J m$^{-2}$, 160 J m$^{-2}$, 180 J m$^{-2}$, 200, J m$^{-2}$, 220 J m$^{-2}$, 240 J m$^{-2}$, at least about 250 J m$^{-2}$, at least about 260 J m$^{-2}$, at least about 270 J m$^{-2}$, at least about 280 J m$^{-2}$, at least about 290 J m$^{-2}$, and even values of at least about 300 J m$^{-2}$.

As used herein, the term "strong", when describing the adhesion formed by the adhesive material, refers to a shear or tensile strengths of at least about 10 kPa, at least about 20 kPa, at least about 30 kPa, at least about 40 kPa, at least about 50 kPa, at least about 60 kPa, and at least about 70 kPa.

As used herein, the term "robust", when describing the adhesion formed by the adhesive material on a target surface, refers collectively to the toughness and strength of the adhesion, including measurements of interfacial toughness over 100 J m$^{-2}$, shear strength over 30 kPa, and tensile strength over 10 kPa, and in a preferred embodiment, an interfacial toughness of at least about 240 J m$^{-2}$, shear strength of at least about 70 kPa and tensile of at least about 50 kPa.

As used herein, the term "flexible", when describing the shape memory adhesive material, refers a property of thin material in the form of patch, tape, film, strip, or sheet that can physically be twisted and/or bent at the minimum radius of curvature less than 10 mm, preferably less than 5 mm, without mechanical failure.

The present invention generally provides a shape memory adhesive material having a pre-programmed strain, wherein the adhesive is capable of rapid robust adhesion followed by predictive contraction upon contact with a surface having fluid disposed thereon. In particular embodiments, the surface is a wet wounded skin surface. The shape memory adhesive is configured to provide adhesion and contraction that can be maintained for a desired period of time, and which can be easily removed on demand, thus providing a new therapeutic platform for accelerated healing, particularly healing of diabetic wounds.

Reference will now be made in detail to embodiments of the present invention, examples of which are illustrated in the accompanying drawings. Wherever possible, the same reference numbers are used in the drawings and the description to refer to the same or like parts.

According to one aspect, the present invention provides a shape memory adhesive material 1 that includes at least an adhesive layer 2 having a top surface 3 and a bottom surface 5. As shown in FIG. 1C, according to preferred embodiments, the shape memory adhesive material 1 comprises a multi-layered structure which includes an adhesive layer 2 and a non-adhesive backing layer 4 disposed on the top surface 3 of the adhesive layer 2 (FIG. 1C). Preferably, the shape memory adhesive material 1 is generally in the form of a sheet, tape, patch, or film (all of which may be perforated, partially perforated, or not perforated).

The adhesive layer 2 generally comprises a combination of one or more hydrophilic polymers or copolymers, one or more amine coupling groups, and one or more cross linkers. More particularly, the adhesive layer 2 is in the form of a pre-stretched dry adhesive layer (FIG. 1B) comprising a combination of (i) one or more hydrophilic polymers or copolymers that absorb water at dry state grafted with amine-coupling groups, and (ii) crosslinkers.

According to embodiments of the present invention, the (i) one or more hydrophilic polymers or copolymers are selected from any conventional hydrophilic polymers that absorb water at a dry state, including, but not limited to polyacrylic acid, polyacrylamide, polyvinyl alcohol, polyhydroxy ethyl methacrylate, polyethylene glycol, poly vinyl pyrrolidone, poly styrene sulfonate, polyurethane, casein, albumin, gelatin, collagen, chitosan, hyaluronic acid, alginic acid, oxidized alginate, pectin, cellulose, oxidized cellulose, and combinations thereof. Because the present adhesive material can be used in a wide variety of biomedical applications, the polymers used in the present invention are preferably biocompatible (although for non-biomedical applications it would not be necessary to utilize only biocompatible polymer materials). According to preferred embodiments, the one or more hydrophilic polymers contain one or more negatively-charged groups such as poly (acrylic acid), casein, albumin, and alginic acid, whose negatively-charged groups endow hygroscopic properties that are desirable for rapid absorption and removal of interfacial liquid on wet surfaces.

According to embodiments of the present invention, the (ii) one or more amine coupling groups are selected from conventional amine coupling groups, including but not limited to, N-hydroxysuccinimide ester, N-hydroxysulfosuccinimide ester, aldehyde, imidoester, epoxide, isocyanate, catechol, and combinations thereof. Because the present adhesive material can be used in a wide variety of biomedical applications, the amine coupling groups used in the present invention are preferably biocompatible (although for non-biomedical applications it would not be necessary to utilize only biocompatible amine coupling groups). Such amine coupling groups are configured such that the one or more hydrophilic polymers can be grafted with the one or more amine-coupling groups, and such that the one or more amine coupling groups subsequently form covalent crosslinks with the wet/wetted surface on which the adhesive material is used.

According to embodiments of the present invention, the (iii) one or more crosslinkers are selected from conventional crosslinkers, including but not limited to gelatin methacrylate, hyaluronic acid methacrylate, oxidized methacrylic alginate, polycaprolactone diacrylate, N,N'-bis(acryloyl) cystamine, N,N'-methylenebis(acrylamide), polyethylene glycol diacrylate, polyethylene glycol dimethacrylate, and combinations thereof. Because the present adhesive material can be used in a wide variety of biomedical applications, the crosslinkers used in the present invention are preferably biocompatible (although for non-biomedical applications it would not be necessary to utilize only biocompatible crosslinkers).

According to the present invention, the adhesive layer 2 is in the form of a pre-stretched dry layer such that, when it is placed into contact with one or more target surfaces in the presence of fluid (e.g., wet tissue), it absorbs fluid, causing the dry layer to swell. Absorption of fluid and swelling of the dry adhesive layer 2 provides instant temporary crosslinking between the adhesive layer 2 (particularly between carboxylic acid groups, hydroxyl groups, sulfonic acid groups, amine groups, and catechol groups in the adhesive layer 2) and the tissue surface, and further allows for fast subsequent covalent coupling or crosslinking between the one or more amine coupling groups (e.g., NHS ester groups, sulfo-NHS ester groups, aldehyde groups, imidoester groups, epoxide groups) and the one or more surfaces via amine groups naturally present in the tissue surface. Pre-stretching of the adhesive layer 2 is provided such that, when the adhesive layer 2 is placed in contact with one or more target surfaces in the presence of fluid (e.g., wet tissue), it absorbs fluid triggering the hydration-based shape memory mechanism described herein in further detail.

The shape memory adhesive 1 may further include one or more removable or integrated (non-removable) non-adhesive backing layers 4 disposed upon the top and/or bottom surfaces 3,5 of the adhesive layer 2. For example, one or more backing layers 4 may be disposed upon the top and/or bottom surface 3,5 particularly to aid in handling the shape memory adhesive material 1 and to provide protection against moisture and unwanted adhesion. Preferably, backing layers 4 are disposed to cover the entire surfaces 3,5 of the adhesive layer 2 on which they are disposed. However, if desired, the backing layer 4 can be configured to cover only a portion of (or one or more portions of) the surfaces 3,5 on which they are disposed, while leaving one or more portions of the surfaces 3,5 exposed.

According to an exemplary embodiment, the shape memory adhesive 1 includes a backing layer 4 disposed on the top surface 3 of the adhesive layer 2 (e.g., as shown in FIG. 1C). The bottom surface 5 of the adhesive layer 2 may be exposed (i.e., not provided with a backing layer 5) or, if desired, may be provided with a removable backing layer 4 (not shown). During use, the exposed bottom surface 5 of the adhesive layer 2 is placed in contact with the target surface for adhesion. If a backing layer 4 is provided on the bottom surface 5, it may be removed prior to use to expose the bottom surface 5. For single-sided adhesion (i.e., adhesion to a target surface on only the bottom surface 5 of the adhesive layer 2), the backing layer 4 provided on the top surface 3 is in the form of a non-adhesive layer that protects the top surface 3 (or one or more portions of the top surface 3) from adhering to surfaces during use. In this embodiment, this backing layer 4 on the top surface may be in the form of an integrated backing layer or a removable backing layer 4 which is not removed prior to or during use.

According to embodiments where double-sided adhesion is desired, the backing layer 4 may be completely or partially omitted from the shape memory adhesive material 1, or may be provided on the top surface 3 and/or bottom surface 5 and removed prior to use to expose the bottom and top surfaces 3,5 which could then be sandwiched between multiple target surfaces for adhesion to the surfaces.

In some applications, it may be desirable to have a combination of one or more removable and one or more integrated backing layers 4 disposed on a single surface so that the adhesive properties of only those portions of the surface with the removable backing layer 4 disposed thereon may be used by removing the removable backing layer 4 from those portions, while the adhesive properties of those portions of the surface with the integrated backing layer 4 disposed thereon are not utilized. For example, a central portion of a bottom surface 5 of an adhesive layer 2 may have an integrated backing layer disposed thereon, while portions of the bottom surface 5 surrounding the central portion may have one or more removable backing layers disposed thereon (not shown). This will provide a configuration in which the bottom surface 5 of the adhesive layer 2 will adhere to a target surface along an outside portion or perimeter of the adhesive layer 2 upon removal of the removable backing layers 4, while a central portion of the adhesive layer 2 will not adhere due to the integrated backing layer 4 which is not removed. Embodiments of the present invention further include any other suitable configurations of removable and integrated backing layers 4 based on a particular use and target surface.

The backing layers 4 are generally provided so as to prevent adhesion of the underlying adhesive layer 2 to a surface prior to the intended time of use and/or to prevent adhesion of the underlying adhesive layer 2 (e.g., adhesion of a top or bottom surface 3,5) to a non-target surface while the adhesive material 1 is in use. As such, the backing layer 4 is one which blocks the adhesive properties of the adhesive layer 2. Because adhesion is triggered by contacting the adhesive layer 2 with a fluid, the backing layer 4 can generally be fabricated of any material that prevents liquid from coming into contact with the underlying adhesive layer 2. According to embodiments of the invention, the backing layer 4 is a pre-stretched dry polymer backing layer (FIGS. 1 and 3) fabricated of a biocompatible material that is non-adhesive to wet surfaces, such as wet tissue surfaces. Some exemplary polymeric materials suitable for use in forming the non-adhesive backing layer 5 include, but are not limited to, polyurethanes, silicone rubbers, styrene-butadiene-styrene copolymers, butyl rubbers, latex rubbers, and hydrogels.

In an exemplary embodiment, the present invention shape memory adhesive material 1 comprises one or more dry non-adhesive polymer backing layers 4 formed of hydrophilic polyurethane disposed on one or more surfaces 3,5 of a dry adhesive layer 2 formed of an interpenetrating network of chitosan and poly(acrylic acid) (PAA) grafted with N-hydroxysuccinimide (NHS) ester.

According to the present invention, the shape memory adhesive material 1 is provided with a hydration-based shape memory mechanism configured to achieve fast and precisely tunable mechanical contraction based on a predetermined amount of pre-stretch stored in the dry state, The hydration-based shape memory mechanism relies on significant mechanical modulus changes of the hydrogels (forming the adhesive layer 2) in the hydrated rubbery state and the dry glassy state. Generally, the adhesive layer 2 demonstrates a particular Young's modulus in its dry state, while it demonstrates several orders of magnitudes lower Young's modulus when in its swollen hydrated rubbery state. For example, in one embodiment, the adhesive layer 2 exhibits a Young's modulus around 5.4 GPa in the dry state while it exhibits a Young's modulus of 36 kPa (equivalent to shear modulus of 12 kPa) when swollen in physiological saline (e.g., see FIG. 2). By utilizing the hydration-based shape memory mechanism, the non-adhesive polymer backing layer 4 and the adhesive layer 2 forming the shape memory adhesive material 1 are pre-stretched in their hydrated state (i.e., the rubbery state where mechanical properties and behaviors are that of elastomeric rubbers such as low Young's modulus, elastic recovery after release of stretch, etc.) to a prescribed amount in each direction (particularly length and width), and then the pre-stretched adhesive material 1 is dried into its dry and stable state (i.e., the glass state where mechanical properties and behaviors are that of plastics such as high Young's modulus, plastic deformation after release of stretch, etc) to provide the shape memory properties.

Figure 2B:
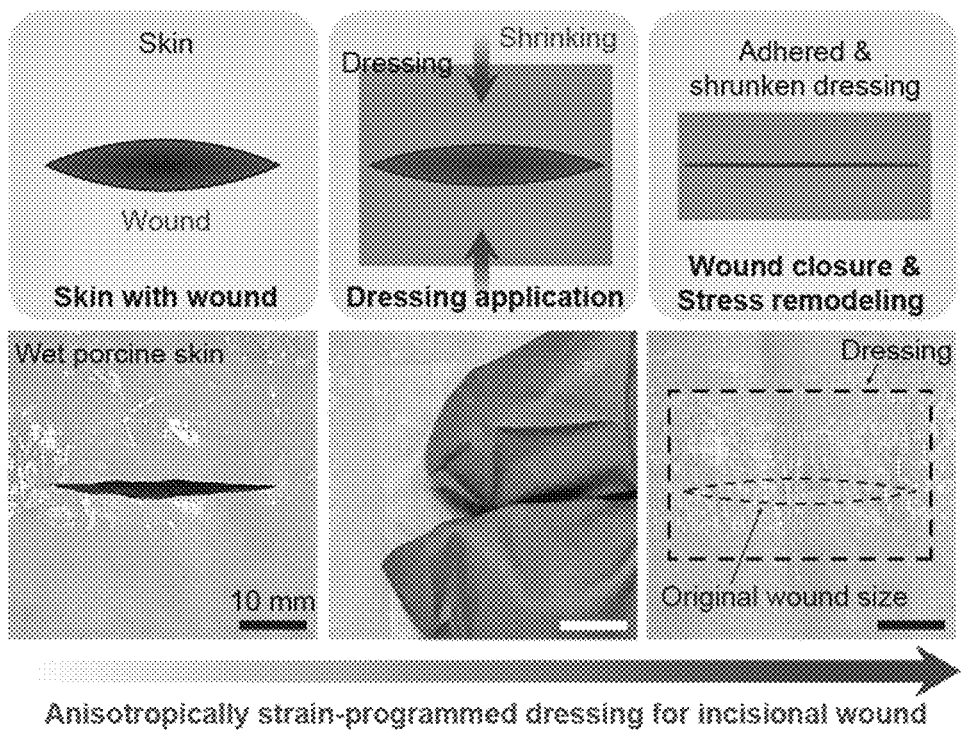

Once hydrated by fluid (e.g., water or other physiological fluids including saline, interstitial fluid, and intracellular fluid from wet tissues), the shape memory adhesive material 1 rapidly transforms from the dry glass state to its hydrated rubber state (typically within less than about 3 minutes, in some embodiments less than about 2 minutes, and in some embodiments less than about 1 minute) and contracts by the elastic recovery of the memorized pre-stretch. Simultaneously, hydration of the shape memory adhesive material 1 also activates the dry-crosslinking mechanism of the adhesive layer 2 to form rapid and robust adhesion by absorbing interfacial fluid or other physiological or externally applied fluids present on or near the target surface, followed by the formation of physical and covalent crosslinks on the target surface. As a result of this combined adhesion and contraction, the shape memory adhesive material 1 is capable of contracting and mechanically modulating and underlying target surface, such as an underlying diabetic wound (FIGS. 1B, 2A-B).

According to various embodiments, one or more layers of the shape memory adhesive material 1, such as an adhesive layer 2 and/or backing layer 4, contains one or more therapeutic agents for delivery during use. In particular, one or more therapeutic agents can be contained within the adhesive layer 2 hydrogel composition for release into underlying tissue and/or wound. As such, the present invention shape memory adhesive material 1 can further serve as a versatile drug delivery platform capable of prolonged and stable release of therapeutic agents to wounds while, at the same time, facilitating healing and closure of the wounds through the pre-programmed contraction.

Figure 4:
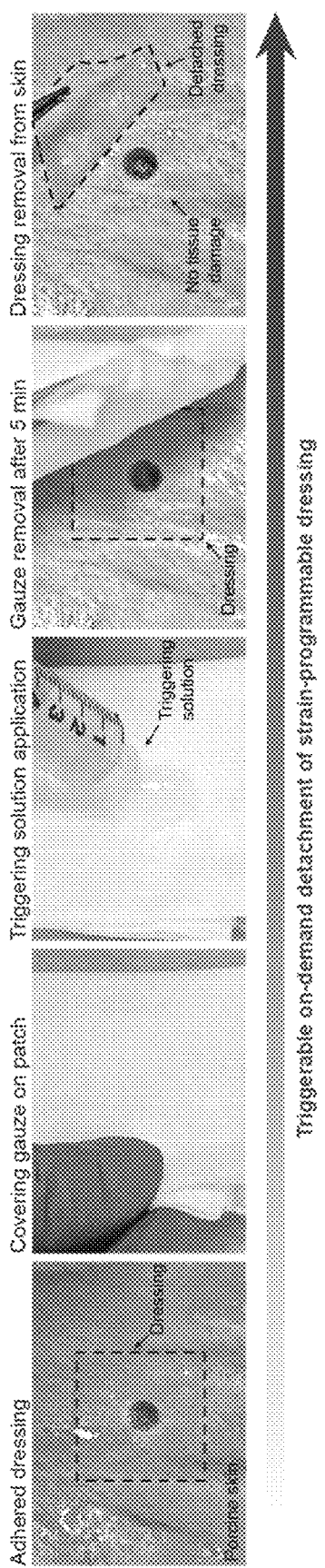
FIG. 4 schematically illustrates triggerable on-demand detachment of a shape memory adhesive (dressing) according to an embodiment of the present invention.

According to embodiments of the present invention, the shape memory adhesive material 1 is configured such that, after adhering to a target surface, it can be atraumatically detached from the surface on-demand by applying a biocompatible triggering solution. For example, application of the triggering solution enables easy removal of an adhered shape memory adhesive material 1 within about 5 min after the application of the triggering solution without causing any mechanical damage to the underlying tissue (FIG. 4). Such on-demand removal capability of the strain-programmable dressing will be highly favorable feature for care of various wounds, particularly diabetic wounds in clinical settings which require frequent changes of wound dressings. The triggering solution generally is a combination of reagents to break physical crosslinks including but not limited to bicarbonate, sodium bicarbonate, disodium phosphate, 2-(N-morpholino)ethanesulfonic acid; and reagents to break covalent crosslinks including but not limited to L-glutathione, Cysteine, 2-Mercaptoethanol, dithiothreitol, Guanidine. According to a preferred embodiment, the triggering solution is formed of 0.5 M sodium bicarbonate and 50 mM L-glutathione reduced and dissolved in phosphate buffered saline (PBS).

Fabrication of the Shape Memory Adhesive Material

Figure 12:
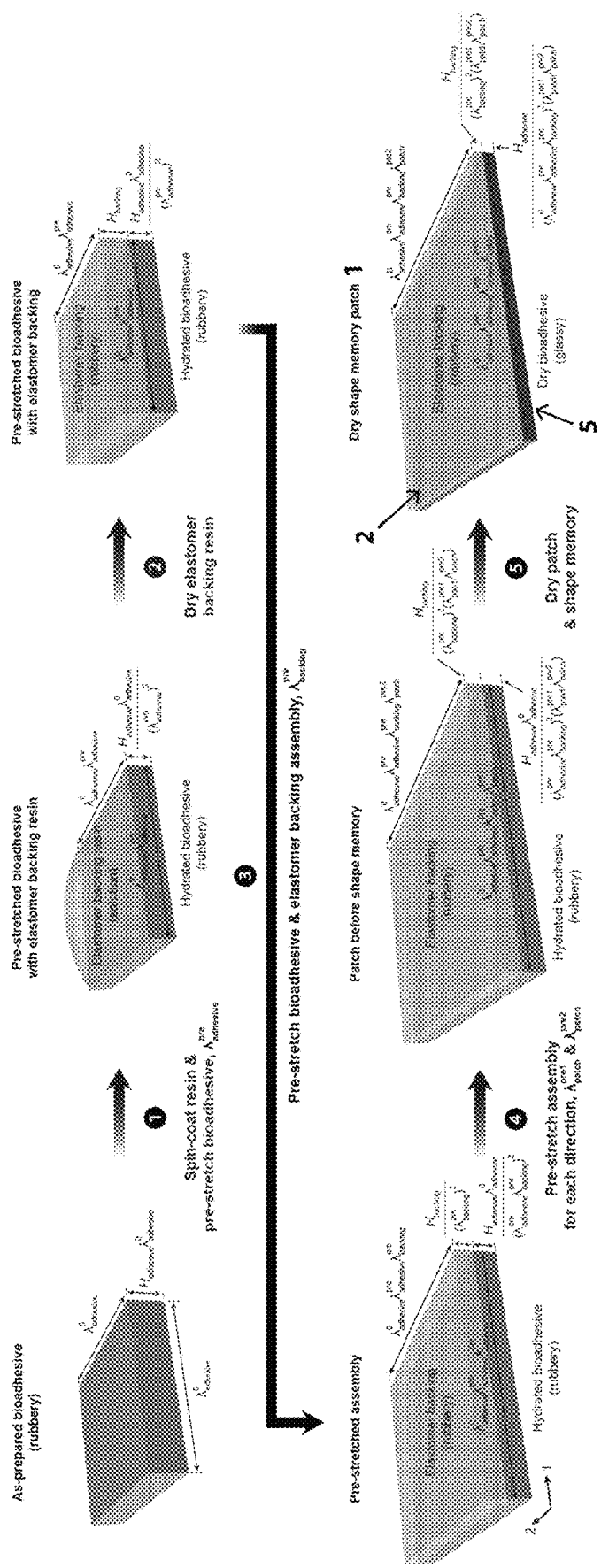
FIG. 12 schematically illustrates a hydration-based shape memory fabrication process according to an embodiment of the present invention, where Step (1) spin-coats an elastomer backing resin layer on an as-prepared bioadhesive layer and pre-stretches the as-prepared bioadhesive covered with uncured elastomer backing resin $\lambda_{adhesive}^{pre}$, Step (2) dries the elastomer backing resin layer while keeping the bioadhesive layer hydrated, Step (3) pre-stretches the bioadhesive layer and elastomer backing layer assembly $\lambda_{backing}^{pre}$, Step (4) pre-stretches the bioadhesive patch for each direction, and Step (5) dries the bioadhesive patch to thereby provide a shape memory bioadhesive patch.

Based on the present invention hydration-based shape memory mechanism, the shape memory adhesive material 1 is fabricated through a process of multiple steps of pre-stretch and drying processes (e.g., see FIGS. 1C, 12). Since both the dry non-adhesive backing layer(s) 4 and dry adhesive layer 2 forming the shape memory adhesive material 1 are configured to absorb fluid and based on their individual properties will swell in a wet physiological environment to varying degrees (as demonstrated by FIGS. 13A-C), the fabrication process of the shape memory adhesive material 1 was divided into five steps.

Initially, the as-prepared shape memory adhesive material 1 in the rubber state has the dimension of $\lambda_{adhesive}^0$ in length and width and $H_{adhesive}\lambda_{adhesive}^0$ in thickness. The following five step process was then carried out.

Step 1. The non-adhesive polymer backing resin layer 4 (i.e., before curing) is disposed on the as-prepared adhesive layer 2 (e.g., by spin coating, spray coating, dip coating, silk-printing, direct ink writing, etc), and the adhesive layer 2 is pre-stretched with $\lambda_{adhesive}^{pre}$ to cancel out the swelling mismatch between the non-adhesive polymer backing layer 4 and the adhesive layer 2 (Step 1 in FIG. 12). After this step, the resulting adhesive layer 2 in the rubbery state has the dimension of $\lambda_{adhesive}^0\lambda_{adhesive}^{pre}$ in length and width and $(H_{adhesive}\lambda_{adhesive}^0)(\lambda_{adhesive}^{pre})^{-2}$ in thickness. It is noted that while the polymer backing resin layer 5 is disposed on the adhesive layer 2 during this pre-stretching step, this non-adhesive backing resin layer 4 is uncured and, thus, in a fluid or resin state. As such, the backing resin layer 4 is not considered to be "pre-stretched" but rather, flows in its fluid state during pre-stretching of the adhesive layer 2. Thus, no pre-stretch properties are imparted on the uncured backing resin layer 4 in this step. If desired, in some embodiments of Step 1, the adhesive layer 2 is pre-stretched prior to disposing the non-adhesive polymer backing resin layer 4 on the adhesive layer 2.

Step 2. The non-adhesive polymer backing layer 4 is cured on the pre-stretched adhesive layer 2 (Step 2 in FIG. 12). The curing of the non-adhesive polymer backing can be achieved by conventional curing mechanisms, including but not limited to evaporation of solvent in resin, thermal curing, irradiation of high-energy light (e.g., ultraviolet light), and chemical curing by crosslinking agents. In particular, this curing of the backing layer 4 is carried out while keeping the adhesive layer 2 in a hydrated state using any suitable means that will prevent excessive evaporation of solvent (e.g., water). For example, the excessive evaporation of solvent can be prevented by performing the process in chamber with high humidity (e.g., over 80% relative humidity), performing the process quickly (e.g., within less than 10 minutes), or a combination of both. After this step, the non-adhesive backing layer 4 in the rubbery state has the dimension of $\lambda_{adhesive}^0\lambda_{adhesive}^{pre}$ in length and width and $H_{backing}$ in thickness; the adhesive layer 2 in the rubbery state has the dimension of $\lambda_{adhesive}^0\lambda_{adhesive}^{pre}$ in length and width and $(H_{adhesive}\lambda_{adhesive}^0)(\lambda_{adhesive}^{pre})^{-2}$ in thickness.

Step 3. Both the non-adhesive backing layer 4 and the adhesive layer 2 are pre-stretched in length and/or width directions, with $\lambda_{backing}^{pre}$ to cancel out the dimensional change of the adhesive material 1 by swelling in wet physiological environment (Step 3 in FIG. 12). After this step, the where pre-stretching in both length and width is carried out, the non-adhesive backing layer 4 in the rubbery state has the dimension of $\lambda_{adhesive}^{0}\lambda_{adhesive}^{pre}\lambda_{backing}^{pre}$ in length and width and $(H_{backing})(\lambda_{backing}^{pre})^{-2}$ in thickness; the adhesive layer 2 in the rubbery state has the dimension of $\lambda_{adhesive}^{0}\lambda_{adhesive}^{pre}\lambda_{backing}^{pre}$ in length and width and $(H_{adhesive}\lambda_{adhesive}^{0})(\lambda_{adhesive}^{pre}\lambda_{backing}^{pre})^{-2}$ in thickness. In embodiments in which pre-stretching is carried out in Step 3 only in length or only in width (but not both) directions, only that direction in which pre-stretching is carried out would be provided with the above-modified dimensions.

Step 4. Both the non-adhesive backing layer 4 and adhesive layer 2 are pre-stretched with $\lambda_{patch}^{pre1}$ and $\lambda_{patch}^{pre2}$ in length and/or width directions to apply the desired amount of contractions for each direction in which pre-stretching is carried out (Step 4 in FIG. 12). After this step, for embodiments in which pre-stretching is carried out in both the length and width directions, the non-adhesive backing layer 4 in the rubbery state has the dimension of $\lambda_{adhesive}^{0}\lambda_{adhesive}^{pre}\lambda_{backing}^{pre}\lambda_{patch}^{pre1}$ in length, $\lambda_{adhesive}^{0}\lambda_{adhesive}^{pre}\lambda_{backing}^{pre}\lambda_{patch}^{pre2}$ in width, and $(H_{backing})((\lambda_{backing}^{pre})^{2}\lambda_{patch}^{pre1}\lambda_{patch}^{pre2})^{-1}$ in thickness; the adhesive layer 2 in the rubbery state has the dimension of $\lambda_{adhesive}^{0}\lambda_{adhesive}^{pre}\lambda_{backing}^{pre}\lambda_{patch}^{pre1}$ in length, $\lambda_{adhesive}^{0}\lambda_{adhesive}^{pre}\lambda_{backing}^{pre}\lambda_{patch}^{pre2}$ in width, and $(H_{adhesive}\lambda_{adhesive}^{0})((\lambda_{adhesive}^{pre}\lambda_{backing}^{pre})^{2}\lambda_{patch}^{pre1}\lambda_{patch}^{pre2})$ in thickness. In embodiments in which pre-stretching is carried out in Step 4 only in length or only in width (but not both) directions, only that direction in which pre-stretching is carried out would be provided with the above-modified dimensions. Further, only the direction(s) in which pre-stretching is carried out in Step 4 will be provided with shape memory (i.e., contraction on hydration/fluid absorption will only occur in the pre-stretched directions). Thus, for example, in embodiments in which Step 4 includes pre-stretching in both length and width directions, upon hydration/fluid absorption, the shape memory adhesive material 1 will contract in both length and width. On the other hand, if pre-stretching is carried out only in a length direction, upon hydration/fluid absorption, the shape memory adhesive material 1 will contract in only the length direction.

Step 5. The pre-stretched adhesive material 1 is dried to impart the shape memory based on the pre-stretched configuration (Step 5 in FIG. 12). After this step, the non-adhesive polymer backing layer 4 in the rubbery state has the dimension of $\lambda_{adhesive}^{0}\lambda_{adhesive}^{pre}\lambda_{backing}^{pre}\lambda_{patch}^{pre1}$ in length, $\lambda_{adhesive}^{0}\lambda_{adhesive}^{pre}\lambda_{backing}^{pre}\lambda_{patch}^{pre2}$ in width, and $(H_{backing})((\lambda_{backing}^{pre})^{2}\lambda_{patch}^{pre1}\lambda_{patch}^{pre2})^{-1}$ in thickness; the adhesive layer 2 in the rubbery state has the dimension of $\lambda_{adhesive}^{0}\lambda_{adhesive}^{pre}\lambda_{backing}^{pre}\lambda_{patch}^{pre1}$ in length, $\lambda_{adhesive}^{0}\lambda_{adhesive}^{pre}\lambda_{backing}^{pre}\lambda_{patch}^{pre2}$ in width, and $(H_{adhesive}\lambda_{adhesive}^{0})((\lambda_{adhesive}^{pre}\lambda_{backing}^{pre})^{2}\lambda_{patch}^{pre1}\lambda_{patch}^{pre2})^{-1}$ in thickness.

It is noted that while the above-described five step process is a preferred process for imparting the desired shape memory properties in the adhesive material 1, in some embodiments fewer than all five steps can be carried out which include the fundamental processes for pre-stretching and drying which impart the desired hydration-based shape memory properties. It is also noted that the five step process can generally be carried out as outlined, but with some adjustment to the order in which steps/sub-steps are carried out. One skilled in the art can, thus, use the five step process as a general guideline and, if desired, can modify the order and/or inclusion of specific steps to achieve specific shape-memory properties.

For example, in some embodiments, it may be desirable to provide shape-memory (contraction) in certain layers of the adhesive material 1 but not all layers. As such, the steps can be modified to only provide pre-stretching steps in those specific layer(s). For example, it may not be necessary in some applications to impart hydration-based shape memory to the cured backing layer 4 and, thus, only pre-stretching of the adhesive layer 2 to impart shape-memory on the adhesive layer 2 is needed (with any additional pre-stretching process to impart shape-memory on the backing layer 4 eliminated). According to another alternate embodiment, Step 3, which is carried out to cancel out dimensional change of the adhesive material 1 can generally be achieved to a desired degree during the Step 4 pre-stretching. As such, in some embodiments, Step 3 can be skipped. In particular, Step 3 accounts for the possibility that both the adhesive layer 2 and the backing layer(s) 4 will generally swell when exposed to fluid, which generally results in an increase in volume but may also result in increases in length, width, and/or thickness (this can result in an increase in different degrees depending on specific properties of each material). Thus, Step 3 can be provided as a separate step to introduce "non-swelling" characteristic to the shape-memory adhesive. In connection with this, in some embodiments, the present invention provides an adhesive in which swelling upon absorption of fluid is canceled out by carrying out Step 3 tailored to achieve this result, skipping Step 4 (and, thus, skipping imparting the contraction shape-memory properties to the adhesive), and proceeding directly to Step 5.

According to the present invention, it is possible to pre-program either isotropic or anisotropic shape memory in the adhesive material 1 based on the pre-stretching conditions. In particular, in Step 5, if pre-stretching is carried out for both length and width directions, and the pre-stretch in each direction is equal (wherein an "equal" pre-stretch is defined as an equal multiple or percent of stretch of the original dimension, e.g., wherein length and width are both pre-stretched to 2× their original dimension), then isotropic shape memory contraction is pre-programed. If, on the other hand, if the pre-stretch for the length and width directions are not equal (e.g., a greater pre-stretch in length than in width, such as a pre-stretch in length of 2× the original length dimension and a pre-stretch in width of 1.5× the original width dimension), then anisotropic shape memory contraction is pre-programed. In another embodiment, an extreme case of anisotropic shape memory contraction is pre-programed by only carrying out one direction of pre-stretch (e.g., stretching only in length and not in width, or only in width and not in length) such that there is no contraction except in the single direction of pre-stretch. The type of pre-stretch can be based on the shape and type of target surface on which the shape memory adhesive material 1 is used, such as a particular diabetic wound of interest. For example, a large-area excision diabetic wound (or any underlying surface having a wound that requires closure in both lateral and vertical directions, including for example, generally circular and ellipsoid wounds) can benefit from treatment based on an isotropically strain-programmed shape memory adhesive material 1 that contracts and mechanically modulates an underlying wound in both lateral and vertical directions (i.e., length and width) (e.g., see FIGS. 2A and 3A-C). On the other hand, a narrow incisional diabetic wound (or any underlying surface that requires closure mainly in a single direction, e.g., either lateral or vertical) can benefit from treatment based on an anisotropic strain-programmed shape memory adhesive material 1 that contracts and mechanically modulates an underlying wound primarily in a single (e.g. vertical) direction (e.g., see FIGS. 2B and 3D-F).

According to an exemplary embodiment, the swelling ratio of the as-prepared adhesive layer 2 is $\lambda_{adhesive}^0=1.48$, the equilibrium swelling ratio of the adhesive layer 2 is $\lambda_{adhesive}^\infty=3.46$, the equilibrium swelling ratio of the non-adhesive polymer backing layer 4 is $\lambda_{adhesive}^\infty=1.4$, the pre-stretch ratio to cancel out the swelling mismatch is $\lambda_{adhesive}^\infty=(\lambda_{adhesive}^\infty)(\lambda_{adhesive}^0\lambda_{backing}^\infty)^{-1}=1.665$, and pre-stretch ratio to cancel out the swelling of the shape memory adhesive material 1 is $\lambda_{baking}^{pre}=\lambda_{backing}^\infty=1.4$. It is noted that different choices of adhesive layer 2 and non-adhesive polymer backing layer 4 compositions can be suitably be substituted by implementing appropriate values corresponding to each composition.

The stored pre-stretch in the shape memory adhesive material 1 and resultant mechanical modulation of an underlying target surface (e.g., a surface containing a diabetic wound) can be designed and implemented in a highly controllable manner based on a predictive finite-element model. Generally, as it applies to diabetic wound applications, the finite-element model is based on a circular wound in the skin, which is a common form for diabetic wounds. In models, a native existing pre-strain and tension in the skin is taken into account to better elucidate the mechanical modulation of wounds by the shape memory adhesive material 1. Due to the native pre-strain and tension in the skin, the circular wound undergoes an initial enlargement in its diameter and a substantial increase in hoop stress (over 2 times of the native state) (FIGS. 5D and 6D), yielding a stress concentration around the wound edge which can impair wound closure and healing, especially in diabetic wounds (FIGS. 5B,E and 56B,E). This model was validated with experiments on ex vivo diabetic mouse skin (FIG. 5B-D) and pig skin (FIG. 6B-D) where the wound closure ratio predicted by the finite-element model demonstrated close agreement with the experimental measurements.

The present invention shape memory adhesive material 1, thus, was shown to mechanically modulate the wound in diabetic mouse skin and pig skin by (i) reducing the wound diameter (FIGS. 5B-D and 6B-D) and (ii) reducing the hoop stress around the wound edge (FIGS. 5B,E,F and 6B,E,F) to various degrees based on the relative size of the shape memory adhesive material 1 compared to the wound (FIGS. 5D and 6D) and the amount of programmed biaxial pre-stretch $\lambda_{dressing}^{pre}$. In particular, the present invention shape memory adhesive material 1 was shown to effectively reduce the hoop stress concentration around a wound edge at the lower pre-stretch amounts ($\lambda_{dressing}^{pre}=1\text{-}1$ and 1.2), and to turn the hoop stress into compressive at the higher pre-stretch amount ($\lambda_{dressing}^{pre}=1.3$) (FIGS. 5E and 6E).

Tunable Mechanical Contraction of the Shape Memory Adhesive Material

Figure 14A:
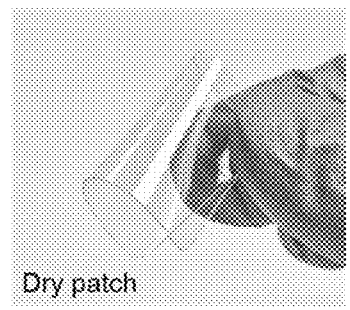
Figure 14B:
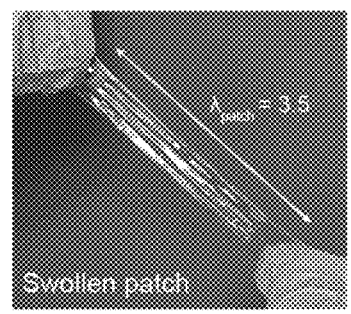
Figure 14C:
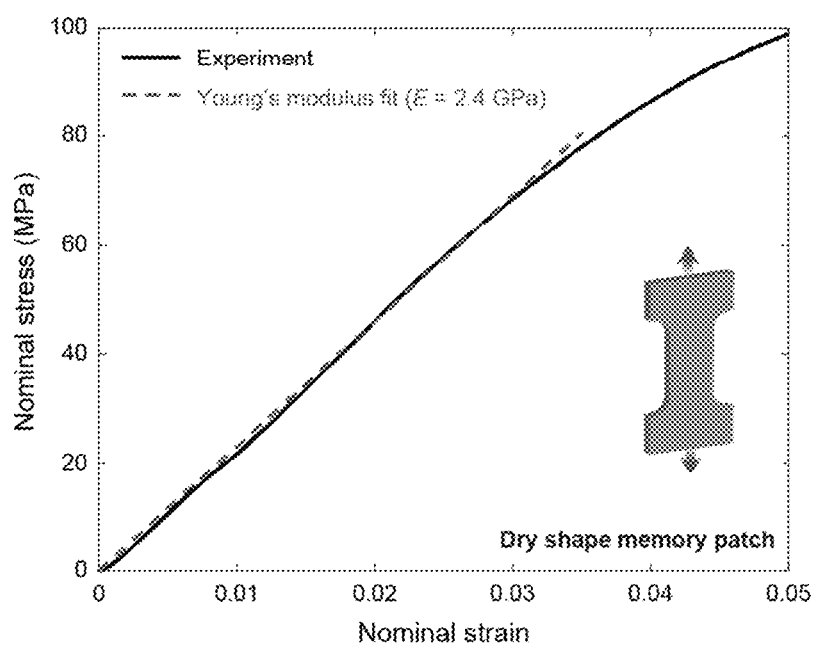
Figure 14D:
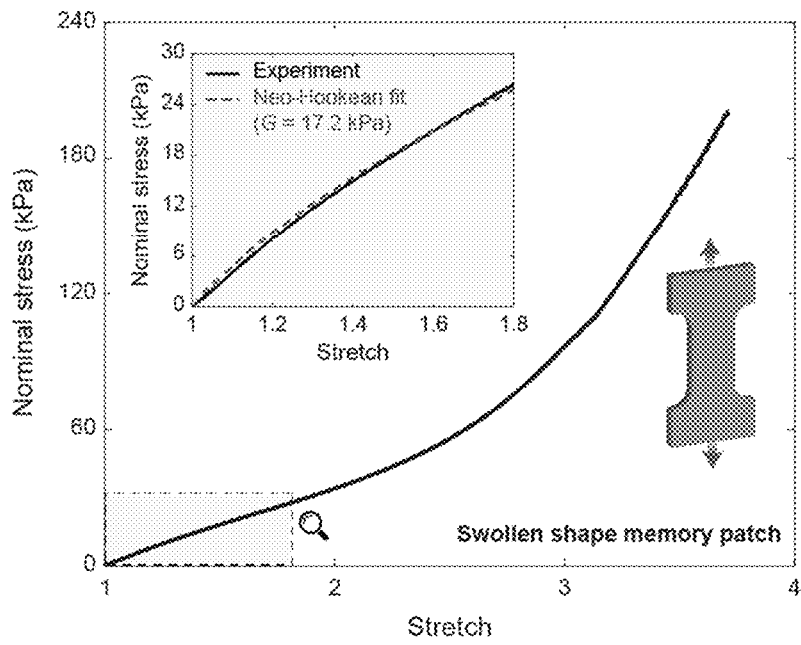
Figure 16:
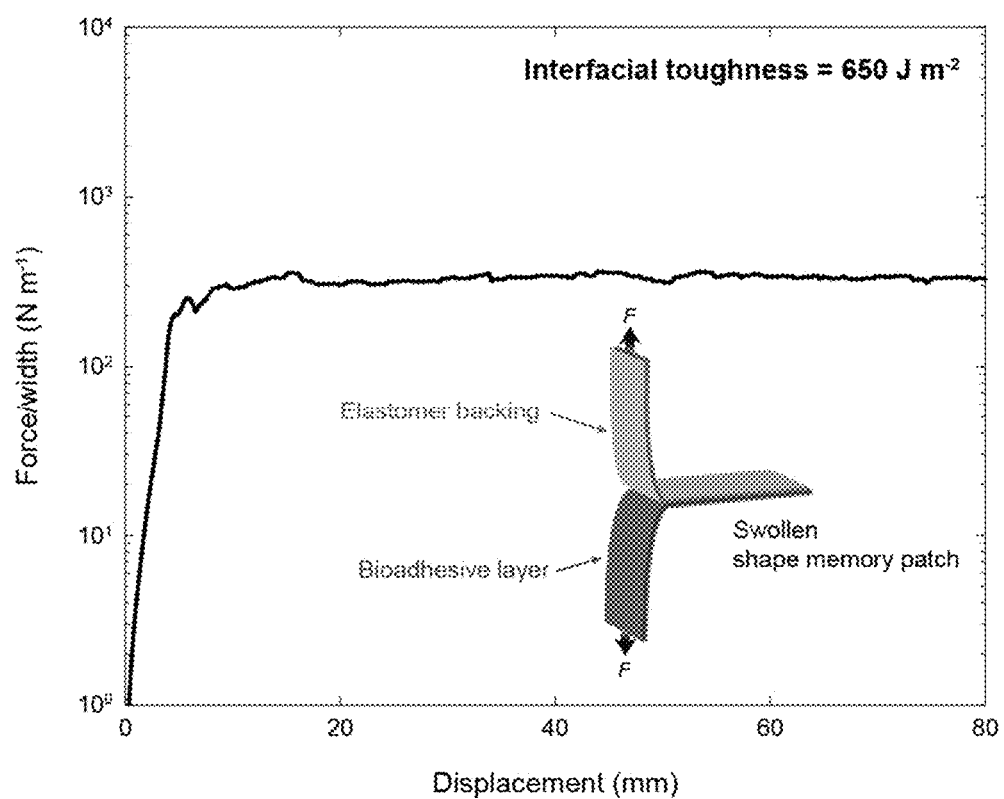
FIG. 16 graphically illustrates interfacial toughness between an elastomer backing layer and bioadhesive layer in a shape memory bioadhesive patch according to an embodiment of the present invention, wherein the measured interfacial toughness between a swollen elastomer backing layer and bioadhesive layer is 650 J m$^{-2}$.
Figure 19A:
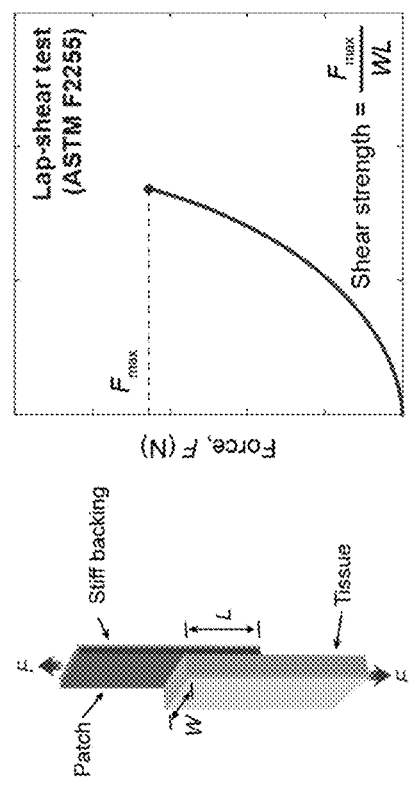
Figure 19B:
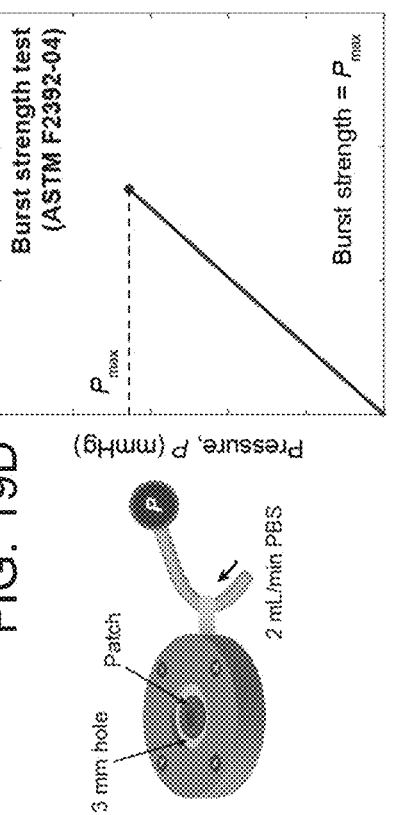
Figure 19C:
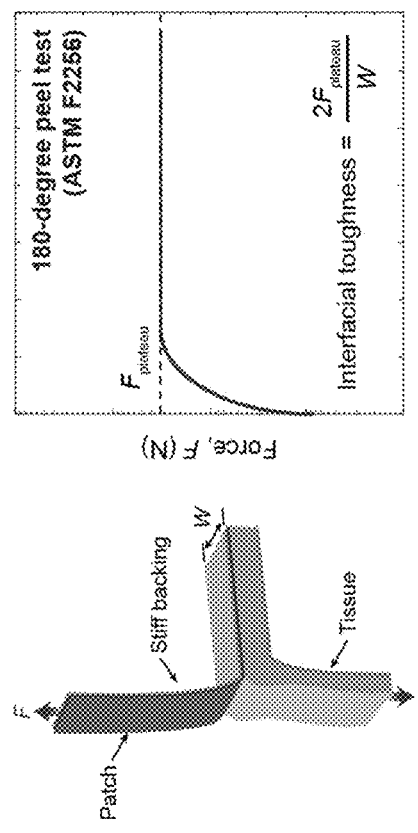
Figure 19D:
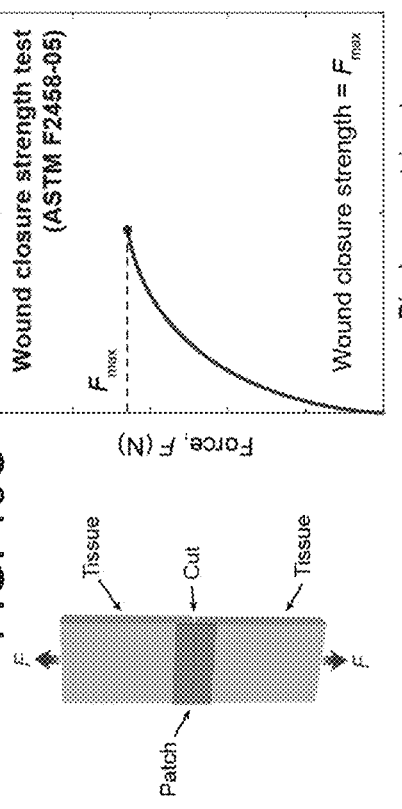

In the dry state, the shape memory adhesive material 1 is a flexible film due to the glassy adhesive layer 2 (e.g., with Young's modulus of about 100 MPa to about 10 GPa) (see FIGS. 14A and C). Once hydrated and swollen (e.g., when provided in a wet physiological environment), the shape memory adhesive material 1 becomes stretchable (ultimate tensile stretch at least over 2 times, preferably over 3 times of the original length) and soft (Young's modulus less than 1 MPa, equivalent to shear modulus of less than 333 kPa (shear modulus of about ⅓ Young's modulus) hydrogel due to the dry glass to hydrated rubbery transition of the hydrated adhesive layer 2 (see FIGS. 14B and D). Furthermore, the shape memory adhesive material 1 demonstrates a high fracture toughness of at least about 300 J m$^{-2}$, in some embodiments at least about 350 J m$^{-2}$, and in an exemplary embodiment at least about 400 J m$^{-2}$ (See FIGS. 15A-C) and high interfacial toughness between the non-adhesive polymer backing and the bioadhesive layer over 600 J m$^{-2}$ (FIG. 16) that provide robust mechanical property against mechanical failures.

Upon hydration of the shape memory adhesive material 1, its original configuration is elastically recovered by contracting in each direction based on the applied pre-stretch during the fabrication and shape memory process (FIGS. 1C and 12). In the fully swollen equilibrium state, the dimensional shrinkage $\lambda_{patch}^{shrink}=(\lambda_{patch}^{pre})^{-1}$ (FIGS. 17A-B) and mechanical stress (FIGS. 18A-B) generated by contraction of the shape memory adhesive material 1 follows the theoretical predictions both for isotropically (i.e., $\lambda_{patch}^{pre1}=\lambda_{patch}^{pre2}$) and anisotropically (i.e., $\lambda_{patch}^{pre1}\neq\lambda_{patch}^{pre2}$) shape memory adhesive materials 1. This predictive and fully tunable shape memory behavior of the proposed structures originates from the unique advantages of the hydration-based shape memory mechanism and highly programmable fabrication process.

Adhesion Performance of the Shape Memory Adhesive Material

The present invention shape memory adhesive material 1 is configured to form rapid and robust adhesion, even on wet surfaces (e.g., within 5 seconds) owing to its dry adhesive layer 1 fabrication. To characterize the adhesion performance of the shape memory adhesive material 1, four standard characterizations were performed, including 180-degree peel test (ASTM F2256) to measure interfacial toughness, lap-shear test (ASTM F2255) to measure shear strength, wound closure strength test (ASTM F2458-05) to measure wound closure strength, and burst strength test (ASTM F2392-04) to measure burst strength (FIGS. 19A-D).

The present invention shape memory adhesive material 1 demonstrated superior adhesion performance compared to existing tissue adhesives and wound dressings including cyanoacrylate-based Dermabond®, polyethylene-glycol-based Coseal, fibrin-based Tachsil®, Tegaderm™, and Embrace® with interfacial toughness over 350 J m$^{-2}$, shear strength over 115 kPa, wound closure strength over 7 N, and burst strength over 310 mmHg (FIGS. 20A-D).

Figure 7B:
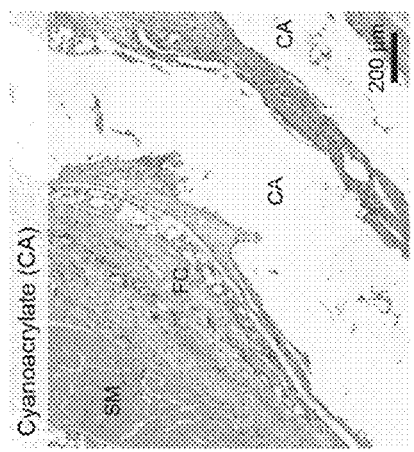
FIGS. 7A-G illustrate representative LIVE/DEAD assay images and the cell viability of mouse embryonic fibroblasts (mEFs) for a control (DMEM) and a shape memory adhesive (dressing) according to an embodiment of the present invention after 24-hour culture (FIG. 7A), with FIGS. 7B-F illustrating representative histological images for a subcutaneously implanted shape memory adhesive according to an embodiment of the present invention (FIG. 7B), subcutaneously implanted Coseal (FIG. 7C), subcutaneously implanted Dermabond® cyanoacrylate (FIG. 7C) subcutaneously implanted adhesive (FIG. 7D), a subcutaneously implanted shape memory adhesive according to an embodiment of the present invention after on-demand detachment (FIG. 7E), and a sham surgery (FIG. 7F) for 4 weeks stained with hematoxylin and eosin (H&E), with FIG. 7H graphically illustrating the degree of inflammation of various groups evaluated by a blinded pathologist (0, normal; 1, very mild; 2, mild; 3, moderate; 4, severe; 5, very severe) after 4 weeks of subcutaneous implantation (SM=skeletal muscle, FC=fibrous capsule, all experiments were repeated four times with similar results. Values in A,G represent the mean and the standard deviation (n=4). P values are determined by a Student's t test; ns, not significant; *p≤0.05.
Figure 7C:
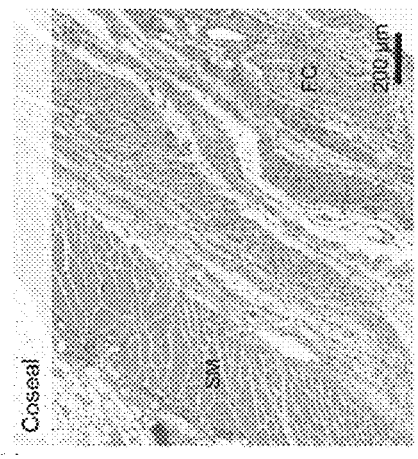
Figure 7D:
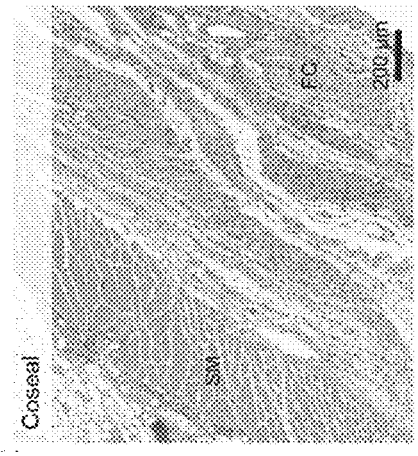
Figure 7A:
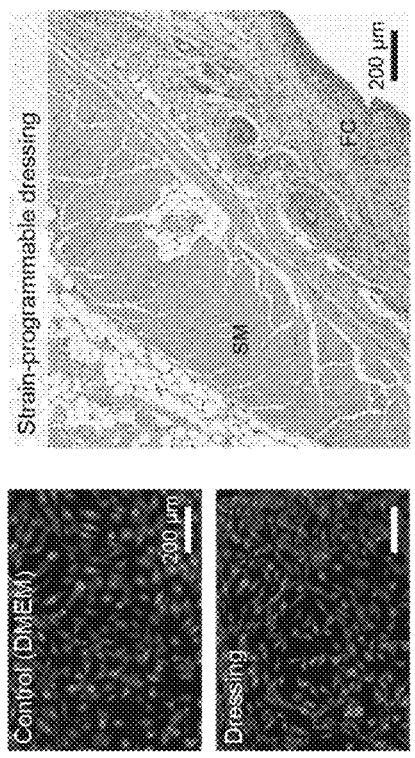
Figure 7E:
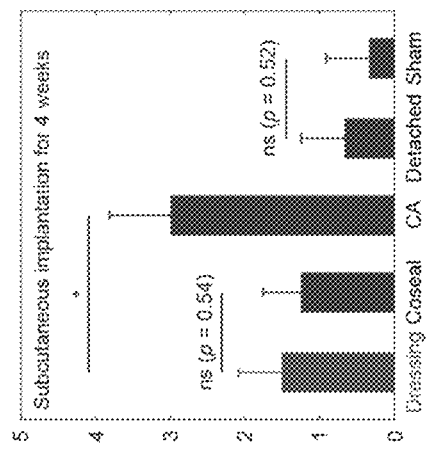
Figure 7F:
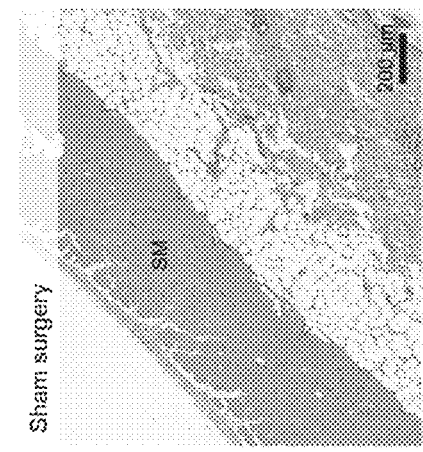
Figure 7G:
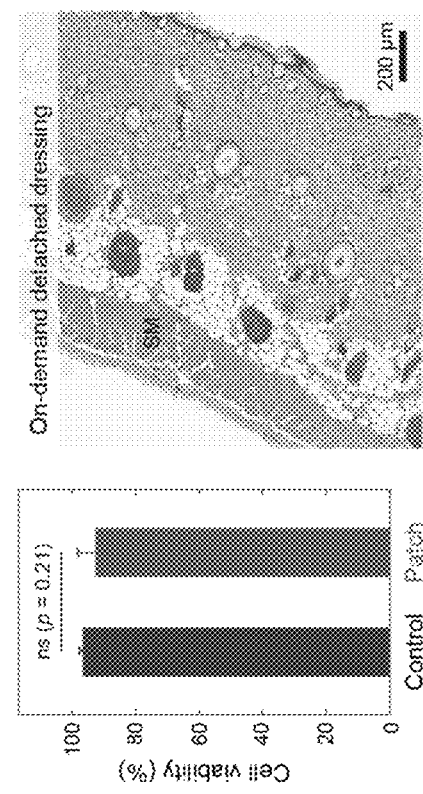

Because the present invention shape memory adhesive material 1 is particularly designed for use on living tissue, particularly for healing diabetic wounds, the shape memory adhesive material 1 is fabricated so as to be biocompatible in fabrication and use. To evaluate the biocompatibility of the shape memory adhesive material 1 and its on-demand detachment process, an in vitro cell viability assay was performed based on mouse embryonic fibroblasts (mEFs) and an in vivo dorsal subcutaneous implantation based on rat model (FIG. 7). The in vitro biocompatibility of the shape memory adhesive material 1 was demonstrated to be comparable to that of the control media (DMEM), showing no statistically significant difference in in vitro cell viability for mEFs after 24-hour culture (FIG. 7A). The histological assessment made by a blinded pathologist indicated that the shape memory adhesive material 1 generated a mild to moderate inflammatory reaction comparable to or lower than that generated by FDA-approved commercially-available tissue adhesives Coseal and Dermabond® (CA), respectively at 4 weeks after the implantation (FIG. 7B-D,G). Furthermore, the triggerable detachment process of the shape memory adhesive material 1 generated a mild inflammatory reaction comparable to that generated by a sham control group (surgery without implantation) at 2 weeks after the surgery (FIG. 7E-G).

According to embodiments of the present invention, in the acute or short-term period (i.e., time period of less than about 3 days in wound healing perspective, where mechanical effect is dominant), the shape memory adhesive material 1 effectively promotes diabetic wound healing by applying mechanical contraction and subsequently approximating the wound edges the application on wet/wetted wounded tissues (FIGS. 5C,D and 6C,D). In the chronic or long-term period (e.g., a time period of more than about 3 days in wound healing perspective where biological healing process becomes a major factor), the shape memory adhesive material 1 promotes diabetic wound healing by providing a favorable mechanical environment through remodeling of the stress state around the wound, including the reduction in the hoop stress concentration (FIGS. 5B,E,F and 6B,E,F).

Figure 8F:
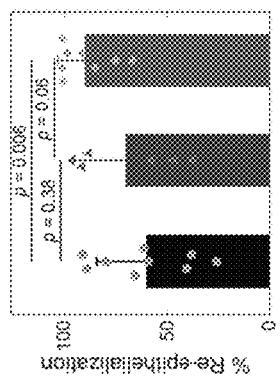
Figure 8G:
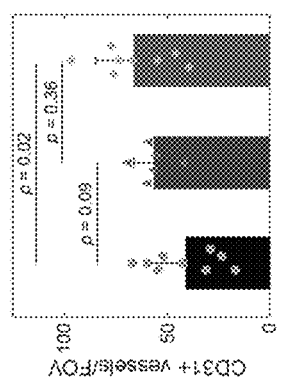
Figure 8H:
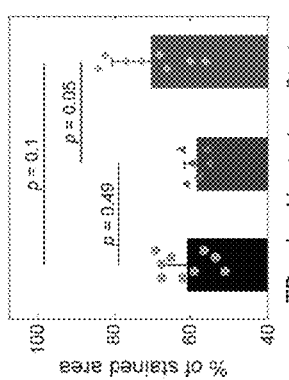
Figure 8I:
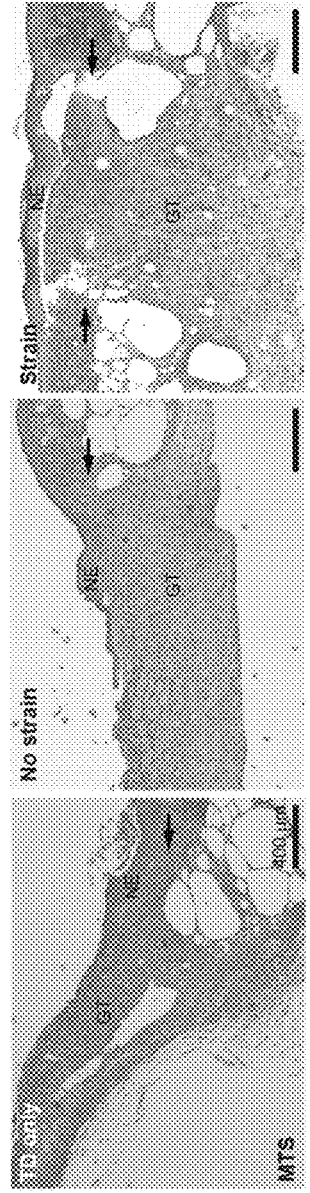
Figure 8J:
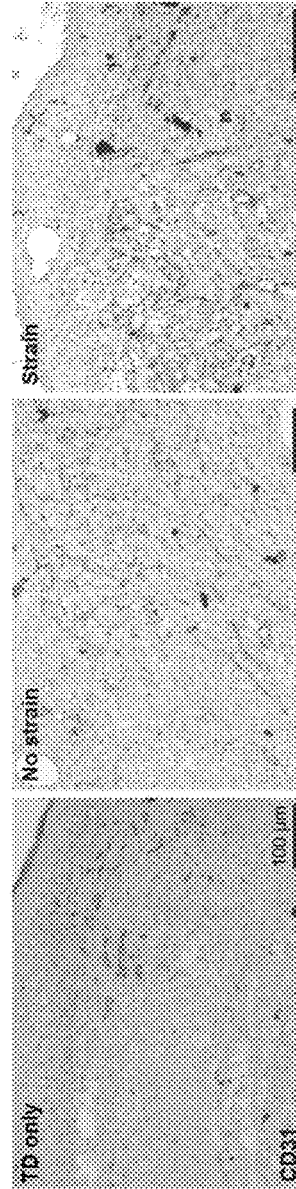
Figure 8K:
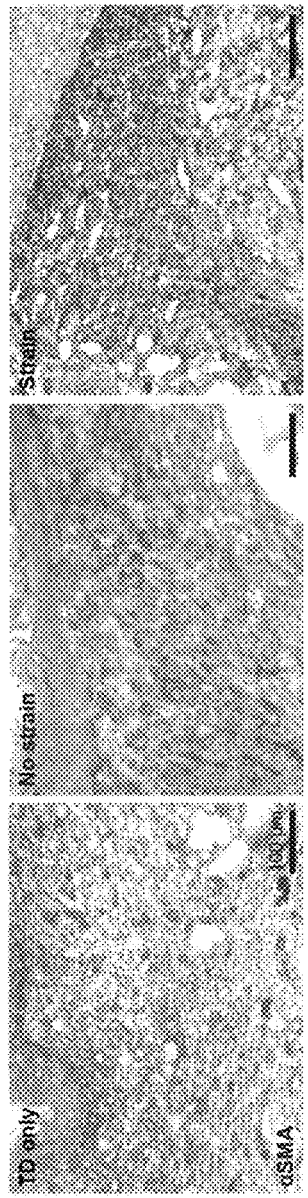

To assess use of the shape memory adhesive material 1 in vivo, an established model of impaired diabetic wound healing was used—the db/db mouse. Application of the shape memory adhesive material 1 onto 6 mm dorsal excisional wounds resulted in improved wound closure at 10 days post-injury, as evaluated both by the % of open wound and degree of re-epithelialization (FIG. 8D,E,G). Strain-programmable dressings exhibited a remarkable enhancement in wound closure by day 5 post-injury, 55.4±22.6% open wound vs 81.1±14.2% for Tegaderm (TD) only and 96.7±24.4% for no strain dressings. Interestingly, the no strain dressings performed worse than TD control (FIG. 8D). Furthermore, on Day 10, the strain dressings led to significantly improved healing compared to both TD and No Strain group (28.9±16.7% open wound area vs 63.9±17.8% and 63.7±21% respectively) (FIG. 8E). In addition, the wounds treated by the shape memory adhesive material 1 exhibited enhanced vascularization as evidenced by higher density of CD31+ vessels (FIG. 8H,I) and augmented collagen deposition shown by the quantification of Masson's Trichrome Stain (FIG. 8F). There was also a demonstrated trend for increased levels of pericyte and vascular endothelial cell marker αSMA in the wounds treated with the shape memory adhesive material 1 (FIG. 8J,K). No differences were detected in the number of CD68+ macrophages or proliferating Ki67+ cells within the wounds (FIG. 9C-F).

To better understand the mechanisms of the observed wound healing acceleration, bulk RNA-seq was performed on D10 wound tissues. Principal component analysis (PCA) revealed separate clusters of the samples according to treatment, indicating distinct transcriptome profiles (FIG. 10A). Differential gene expression analysis with log(fold change) <1 or >1 and false discovery rate (FDR) <0.05 on wounds treated with the shape memory adhesive material 1 versus Tegaderm (TD) only identified 3,581 significantly modified genes (1681 upregulated) (FIG. 10B) and 62 genes (14 upregulated) when using the shape memory adhesive material 1 vs. dressings with no strain (FIG. 10C). Genes that were highly expressed in no strain conditions and TD conditions compared to strain (i.e. application of the shape memory adhesive material 1) includes muscle contraction and metabolism associated markers, such as Myh7, Myl3, Myh8, Myoc, Myom2 and Tnnt1. Furthermore, overrepresentation analysis of the top differentially expressed genes highlighted the enrichment of multiple processes linked to muscle contraction (FIG. 10D-G). Similar analysis for no strain conditions versus TD yielded cytokine related pathways as most enriched (FIG. 11). Collectively, these findings suggest that applying the present invention shape memory adhesive material 1 on murine skin promotes faster keratinocyte migration to cover the wound and alleviates the tension of the tissue leading to diminished myofibroblast presence.

To further validate the feasibility of the present invention shape memory adhesive material 1 for diabetic wound healing, a preliminary study using an established ex vivo human skin culture model was used (FIG. 21A). Freshly excised skin was cleaned from adipose tissue, cut into approximately 2×2 cm squares to accommodate similarly sized patches used in the mouse model and placed dermis side down on petri dishes ensuring that the epidermis remains at the air-liquid interface. 6 mm biopsy punches were then employed to inflict partial thickness wounds extending to the lower dermis, thus allowing the migration of keratinocytes over the wounded areas. Immediately following injury, Tegaderm only dressing (TD), control no strain dressings ($\lambda_{dressing}^{pre}=1$), and the shape memory adhesive material (strain, $\lambda_{dressing}^{pre}=1.3$) were applied onto the wounds (FIG. 21B,C). Hyperglycemic culture media was added and changed daily until study completion on Day 4 post-wounding when wounds were collected for histology and RNA/protein isolation. Wound closure was quantified by measuring the length of the uncovered dermis by the migrating epithelial tongue. As initial analysis showed that Tegaderm behaved similar to the no-strain dressings, the focus was on the differences between no-strain dressings and the present invention shape memory adhesive material 1. The present invention shape memory adhesive material 1 demonstrated more efficient wound closure than no strain dressings (FIG. 21D). In addition, assessing CD31 tissue expression under the guidance of an experienced dermatopathologist, revealed a markedly increased presence of blood vessels especially near the wounded area (FIG. 21E, F). These results highlight the efficiency of the present invention shape memory adhesive material 1 in promoting healing of human wounds, and their particular benefit for DFU treatment.

Materials and Methods for an Example Embodiment

Preparation of the shape memory adhesive material. To prepare the adhesive layer, acrylic acid (30 w/w %), chitosan (HMC+ Chitoscience Chitosan 95/500, 95% deacetylation, 2 w/w %), α-ketoglutaric acid (0.2 w/w %), and poly (ethylene glycol methacrylate) (PEGDMA; Mn=550, 0.03 w/w %) were dissolved in deionized water. Then, 100 mg functional monomer (NHS ester functionalized monomer with disulfide bond) was dissolved in 1 ml acetone and added to 10 ml of the above stock solution to get a precursor solution. The precursor solution was then poured on a glass mold with spacers (the thickness is 210 μm unless otherwise mentioned) and cured in ultraviolet light chamber (284 nm, 10 W power) for 30 min. As a non-adhesive layer resin, 10 w/w % hydrophilic polyurethane (Advansource Biomaterials) in ethanol/water mixture (95:5 v/v) was spin-coated on the as-prepared tissue adhesive at various speed.

Then, certain pre-stretches were applied to the assembled layered structure in lateral and/or vertical directions (depending on whether an isotropic or anisotropic shape memory adhesive material 1 was being prepared) followed by drying to program the pre-stretch into the shape memory adhesive material 1. The prepared dry shape memory adhesive material 1 was sealed in a plastic bag with desiccants (silica gel packets with active charcoal, McMaster Carr) and stored at −20° C. before use. To prepare the triggering solution, 0.5 M sodium bicarbonate (SBC) and L-glutathione reduced (GSH) were dissolved in phosphate buffered saline (PBS). The triggering solution was filtered by using a 0.2-μm sterile syringe filter before use.

In vitro biocompatibility. In vitro biocompatibility tests were conducted by using a shape memory adhesive material-conditioned media for cell culture. To prepare the shape memory adhesive material-conditioned media for in vitro biocompatibility tests, 20 mg of the shape memory adhesive material was incubated in 1 mL Dulbecco's modified eagle medium (DMEM) at 37° C. for 24 h. Pristine DMEM was used as a control. Wild-type mouse embryonic fibroblasts (mEFs) were plated in 96-well plate (N=6 per each case). The cells were then treated with the shape memory adhesive material-conditioned media and incubated at 37° C. for 24 h in 5% $CO_2$. The cell viability was determined with a LIVE/DEAD viability/cytotoxicity kit for mammalian cells (Thermo Fisher Scientific) by adding 4 μM calcein and ethidium homodimer-1 into the culture media. A confocal microscope (SP 8, Leica) was used to image live cells with excitation/emission at 495 nm/515 nm, and dead cells at 495 nm/635 nm, respectively. The cell viability was calculated by counting live (green fluorescence) and dead (red fluorescence) cells by using ImageJ.

Ex vivo study. For isotropic closure of porcine skin wounds, a hole was made on a porcine belly with an 8-mm biopsy punch. For anisotropic closure of porcine skin wounds, a 3-cm long laceration was made on a porcine belly with a scalpel. For closure of diabetic mouse skin wounds, a hole was made on a dorsal skin with a 6-mm biopsy punch. The present invention shape memory adhesive material with $\lambda_{dressing}^{pre}=1.3$ (for both biaxial and uniaxial pre-stretch) was used for ex vivo study.

In vivo biocompatibility. Female Sprague Dawley rats (225-250 g, Charles River Laboratories) were used for all in vivo studies. Before implantation, the shape memory adhesive material was prepared using aseptic techniques and was further sterilized for 3 hours under UV light. For implantation in the dorsal subcutaneous space, rats were anesthetized using isoflurane (1-2% isoflurane in oxygen) in an anesthetizing chamber. Anesthesia was maintained using a nose cone. The back hair was removed and the animals were placed over a heating pad for the duration of the surgery. The subcutaneous space was accessed by a 1-2 cm skin incision per implant in the center of the animal's back. To create space for implant placement, blunt dissection was performed from the incision towards the animal shoulder blades. For the sham surgery group, no implant was placed in the subcutaneous pocket (n=4). For the triggerable detachment group, a shape memory adhesive material (10 mm in width and 20 mm in length) was placed in the subcutaneous pocket created above the incision and detached 5 min after applying 1 mL of the triggering solution (n=4). For the dressing group, a shape memory adhesive material (10 mm in width and 20 mm in length) was placed in the subcutaneous pocket created above the incision without detachment (n=4). For commercially-available tissue adhesive groups, 0.5 mL of Coseal (n=4) and Dermabond® cyanoacrylate adhesive (n=4) were injected in the subcutaneous pocket created above the incision. The incision was closed using interrupted sutures (4-0 Vicryl, Ethicon) and 3-6 ml of saline were injected subcutaneously. Up to four implants were placed per animal ensuring no overlap between each subcutaneous pocket created. After 4 weeks following the implantation, the animals were euthanized by $CO_2$ inhalation. Subcutaneous regions of interest were excised and fixed in 10% formalin for 24 h for histological analyses.

Fixed tissue samples were placed into 70% ethanol and submitted for histological processing and hematoxylin and eosin (H&E) staining at the Hope Babette Tang (1983) Histology Facility in the Koch Institute for Integrative Cancer Research at the Massachusetts Institute of Technology. Histological assessment was performed by a blinded pathologist on a scale of 0-5 (0, normal or absent; 1, very mild or minimal; 2, mild; 3, moderate; 4, severe or marked; 5, very severe) to evaluate the degree of inflammation in the tissues surrounding the subcutaneous implants. The degree of acute inflammation was based on the number of neutrophils. The degree of chronic inflammation was based on the presence of lymphocytes, macrophages, and plasma cells. The degree of inflammation was evaluated based on the overall presence of indicators in each histological sample (absent, minimal, mild, moderate, or marked presence). Representative images of each group are shown in the figures.

In vivo wound healing study. Male db/db mice (stock #000642) were obtained from Jackson Laboratories and were acclimated to the animal facility for at least one week before surgery. They were routinely weighed and their blood glucose was assessed with a commercially available glucometer (Contour, Bayer) and confirmed to be >250 mg $dL^{-1}$. 12-week old mice were anesthetized using isoflurane and two circular biopsy punch 6-mm (Integra Miltex) full-thickness wounds were created on their depilated and disinfected dorsum. The present invention shape memory adhesive material, a no strain dressing or no dressing were immediately placed on the wounds. The wounds were then covered with an occlusive dressing (Tegaderm, 3M) for protection. The mice were housed individually after surgery and observed every day until euthanized with excess $CO_2$ on day 10. The wounds were photographed on day 0 and day 10 with a standard iphone5 camera secured on a stand and measured with digital calipers (Thermo Fisher, 14-648-17). A ruler was placed beside the wounds as a scale bar for area calculation. Wound closure was quantified using both ImageJ and caliper measurements and expressed as percentage healed compared to day 0.

Histology and immunohistochemistry. Wound tissues following sacrifice on day 10 were bisected at the wound center. One half was immersed in RNAlater (Thermo Fisher) and stored at −20° C., while the other was fixed in 10% Formalin and processed for paraffin embedding. 5 μm thick sections were used. Masson's Trichrome (MTS) and H&E stains were performed at BIDMC Histology Core. For immunohistochemistry, tissue sections were deparaffinized, rehydrated and antigen retrieval was achieved with citrate buffer pH 6.0 in a pressure cooker for 25 min. They were then blocked in 1% BSA for 1.5 h at RT. The primary antibodies used were rabbit anti-CD68 (1:100; Abcam, ab125212), rabbit anti-Alpha Smooth Muscle Actin (1:100; Abcam, ab5694), rabbit anti-Ki67 (1:300; Abcam, ab15580) and rabbit anti-CD31 (1:100; Abcam, ab28364). After staining with primary antibodies overnight at 4° C., NovaRED (Vector Laboratories) was added for 1 h at RT. Tissue sections were then dehydrated, mounted in Permount (ThermoFisher, SP15-100) and were visualized with Nikon Eclipse E200 brightfield (Nikon) upright microscope. The images were processed with Motic Images Plus 3.0 (Motic) and ImageJ/FIJI software packages and were quantified in a blinded fashion and presented as positive cells/structures per field of view. For MTS quantification the FIJI plugin Colour Deconvolution was used to calculate the percentage of collagen (blue) stain. Re-epithelialization was quantified by measuring the length of the migrating epithelial tongue covering the wound.

RNA extraction, sequencing and analysis. RNA extraction, library preparations, and sequencing reactions were conducted at GENEWIZ, LLC. (South Plainfield, NJ, USA). Total RNA was extracted using the Qiagen RNeasy Plus Universal mini kit following manufacturer's instructions (Qiagen, Hilden, Germany). Extracted RNA samples were quantified using Qubit 2.0 Fluorometer (Life Technologies, Carlsbad, CA, USA) and RNA integrity was checked on Agilent TapeStation 4200 (Agilent Technologies, Palo Alto, CA, USA). RNA sequencing libraries were prepared using the NEBNext Ultra RNA Library Prep Kit for Illumina following manufacturer's instructions (NEB, Ipswich, MA, USA). Briefly, mRNAs were first enriched with Oligo(dT) beads. Enriched mRNAs were fragmented for 15 min at 94° C. First strand and second strand cDNAs were subsequently synthesized. cDNA fragments were end repaired and adenylated at 3' ends, and universal adapters were ligated to cDNA fragments, followed by index addition and library enrichment by limited-cycle PCR. The sequencing libraries were validated on the Agilent TapeStation (Agilent Technologies, Palo Alto, CA, USA), and quantified by using Qubit 2.0 Fluorometer (Invitrogen, Carlsbad, CA) as well as by quantitative PCR (KAPA Biosystems, Wilmington, MA, USA). The sequencing libraries were clustered on 1 lane of a flowcell. After clustering, the flowcell was loaded on the Illumina HiSeq 4000 instrument and the samples were sequenced using a 2×150 bp Paired End (PE) configuration. Image analysis and base calling were conducted by the HiSeq Control Software (HCS). Raw sequence data (.bcl files) generated from Illumina HiSeq were converted into fastq files and de-multiplexed using Illumina's bcl2fastq 2.17 software. One mismatch was allowed for index sequence identification.

Read quality was evaluated using FastQC and data were pre-processed with Cutadapt for adapter removal following best practices. Gene expression against the GRCm38 transcriptome (Ensembl 93 version) was quantified with STAR and featureCounts. Differential gene expression analysis was performed using DESeq2, while ClusterProfiler was utilized for functional enrichment investigations. Genes with log 2|Fold Change|≥1 and False Discovery Rate (FDR) ≤0.05 were considered statistically significant.

Statistical analysis. MATLAB software was used to assess the statistical significance of all comparison studies. Data distribution was assumed to be normal for all parametric tests, but not formally tested. In the statistical analysis for comparison between multiple samples, one-way ANOVA followed by Tukey's multiple comparison test were conducted with the threshold of $*p \leq 0.05$, $p \leq 0.01$, and $*p \leq 0.001$. In the statistical analysis between two data groups, a two-sample Student's t-test was used, and the significance threshold was placed at $*p \leq 0.05$, $p \leq 0.01$, and $*p \leq 0.001$. For the in vivo wound healing experiment, data were analyzed in Graphpad Prism 7.04 using Kruskar-Wallis test with two-step Benjamini, Krieger and Yekutieli correction for multiple comparisons.

The present invention, thus, provides a new type of shape memory adhesive that overcomes existing limitations of adhesive materials, particularly as these adhesive materials relate to use on diabetic wounds. In particular, the reduced contractibility of diabetic wounds compared to non-diabetic wounds is believed to be one of the sources of impaired diabetic wound healing. The present shape memory adhesive material is a biomaterial capable of forming instant yet robust adhesion on wet and wounded tissues, while simultaneously creating highly programmable mechanical contractions around the wounded tissues to facilitate their closure and healing. This shape memory adhesive material can further serve as a versatile drug delivery platform capable of prolonged and stable release of therapeutic agents to wounds, owing to its unique composition and robust adhesion capability on wet and wounded tissues.

What is claimed is:

1. A method of healing a wound comprising:
applying a dry shape-memory adhesive material to a tissue surface surrounding the wound, the dry-shape-memory adhesive having a dry pre-stretched configuration, the tissue surface having fluid disposed thereon; and
allowing the dry pre-stretched shape-memory adhesive material to absorb at least a portion of the fluid and transform to a hydrated rubbery state to trigger (i) hydration-based adhesion to the tissue surface surrounding the wound and (ii) contraction of the shape memory adhesive material from the dry-pre-stretched configuration,
wherein the dry shape-memory adhesive material comprises one or more hydrophilic polymers, one or more amine coupling groups, and one or more cross linkers.

2. A method of healing a diabetic wound comprising:
applying a dry shape-memory adhesive material to a tissue surface surrounding the diabetic wound, the dry-shape-memory adhesive having a dry pre-stretched configuration, the tissue surface having fluid disposed thereon; and
allowing the dry pre-stretched shape-memory adhesive material to absorb at least a portion of the fluid and transform to a hydrated rubbery state to trigger (i) hydration-based adhesion to the tissue surface surrounding the diabetic wound and (ii) contraction of the shape memory adhesive material from the dry-pre-stretched configuration,
wherein the dry shape-memory adhesive material comprises one or more hydrophilic polymers, one or more amine coupling groups, and one or more cross linkers.

3. The method of claim 1, wherein contraction of the shape memory adhesive material comprises contraction in length and/or width from the pre-stretched configuration and contraction of the tissue surface.

4. The method of claim 3, wherein contraction of the tissue surface facilitates closure and healing of the wound.

5. The method of claim 3, wherein contraction of the tissue surface provides uniaxial or biaxial contraction of the wound.

6. The method of claim 1, wherein contraction of the shape memory adhesive material is predetermined based on a predetermined amount of pre-stretched stored in the dry pre-stretched configuration.

7. The method of claim 4, wherein contraction of the tissue mechanically modulates the wound by reducing wound diameter and reducing hoop stress around edges of the wound.

8. The method of claim 7, wherein a degree of wound diameter reduction and/or hoop stress reduction is based on a relative size of the shape memory adhesive material compared to wound size.

9. The method of claim 1, wherein hydration-based adhesion comprises absorbing fluid followed by the formation of physical and covalent crosslinks on the tissue surface.

10. The method of claim 1, wherein the dry shape-memory adhesive material contains one or more therapeutic agents and the method further comprises allowing the one or more therapeutic agents to release into the tissue surface and/or wound.

11. The method of claim 1, wherein the one or more hydrophilic polymers are selected from polyacrylic acid, polyacrylamide, polyvinyl alcohol, polyhydroxy ethyl methacrylate, polyethylene glycol, poly vinyl pyrrolidone, poly styrene sulfonate, casein, albumin, gelatin, collagen, chitosan, hyaluronic acid, alginic acid, oxidized alginate, pectin, and combinations thereof.

12. The method of claim 1, wherein the one or more amine coupling groups are selected from N-hydroxysuccinimide ester, N-hydroxysulfosuccinimide ester, aldehyde, imidoester, epoxide, isocyanate, catechol, and combinations thereof.

13. The method of claim 1, wherein the one or more crosslinkers are selected from gelatin methacrylate, hyaluronic acid methacrylate, oxidized methacrylic alginate, polycaprolactone diacrylate, N,N'-bis(acryloyl) cystamine, N,N'-methylenebis(acrylamide), polyethylene glycol diacrylate, polyethylene glycol dimethacrylate, and combinations thereof.

14. The method of claim 1, further comprising atraumatically detaching the adhered shape memory adhesive from the tissue surface on-demand by applying a biocompatible triggering solution.

15. The method of claim 1, wherein the wound is a large-area excision wound and the dry shape-memory adhesive material is an isotropically pre-programmed shape memory adhesive material that contracts and mechanically modulates the wound in both lateral and vertical directions.

16. The method of claim 1, wherein the wound is a narrow incisional wound and the dry shape memory adhesive material is an anisotropically pre-programmed shape memory adhesive material that contracts and mechanically modulates the wound in a single direction.

17. The method of claim 1, further comprising removing the dry shape-memory adhesive material remains from tissue surface after 2 or more days.

18. The method of claim 1, further comprising removing the dry shape-memory adhesive material after 5 or more days.

19. The method of claim 1, further comprising removing the dry shape-memory adhesive material after 7 or more days.

20. The method of claim 1, further comprising removing the dry shape-memory adhesive material after 10 or more days.

21. The method of claim 1, further comprising removing the dry shape-memory adhesive material after 14 or more days.

22. The method of claim 17, further comprising after removing the dry shape-memory adhesive material, applying a second dry shape memory adhesive material to the tissue surface surrounding the wound.

23. The method of claim 18, further comprising after removing the dry shape-memory adhesive material, applying a second dry shape memory adhesive material to the tissue surface surrounding the wound.

24. The method of claim 19, further comprising after removing the dry shape-memory adhesive material, applying a second dry shape memory adhesive material to the tissue surface surrounding the wound.

25. The method of claim 20, further comprising after removing the dry shape-memory adhesive material, applying a second dry shape memory adhesive material to the tissue surface surrounding the wound.

26. The method of claim 21, further comprising after removing the dry shape-memory adhesive material, applying a second dry shape memory adhesive material to the tissue surface surrounding the wound.

27. The method of claim 22, wherein the second dry shape-memory adhesive has a dry pre-stretched configuration different than the dry shape-memory adhesive that was removed.

28. The method of claim 22, further comprising after removing the dry shape-memory adhesive material, inspecting the wound and selecting the second dry shape-memory adhesive with a predetermined contraction based on wound inspection.

29. The method of claim 28, wherein the predetermined contraction of the second dry shape-memory adhesive is different than a predetermined contraction of the dry shape-memory adhesive that was removed.

30. The method of claim 17, further comprising after removing the dry shape-memory adhesive material, inspecting the wound and applying a second dry shape memory adhesive material to the tissue surface surrounding the wound if a reduction of wound area is less than about 50%.

31. The method of claim 18, further comprising after removing the dry shape-memory adhesive material, inspecting the wound and applying a second dry shape memory adhesive material to the tissue surface surrounding the wound if a reduction of wound area is less than about 50%.

32. The method of claim 19, further comprising after removing the dry shape-memory adhesive material, inspecting the wound and applying a second dry shape memory adhesive material to the tissue surface surrounding the wound if a reduction of wound area is less than about 50%.

33. The method of claim 20, further comprising after removing the dry shape-memory adhesive material, inspecting the wound and applying a second dry shape memory adhesive material to the tissue surface surrounding the wound if a reduction of wound area is less than about 50%.

34. The method of claim 21, further comprising after removing the dry shape-memory adhesive material, inspecting the wound and applying a second dry shape memory adhesive material to the tissue surface surrounding the wound if a reduction of wound area is less than about 50%.

35. The method of claim 30, wherein the second dry shape-memory adhesive has a dry pre-stretched configuration different than the dry shape-memory adhesive that was removed.

36. The method of claim 30, further comprising after removing the dry shape-memory adhesive material, inspecting the wound and selecting the second dry shape-memory adhesive with a predetermined contraction based on wound inspection.

37. The method of claim 36, wherein the predetermined contraction of the second dry shape-memory adhesive is different than a predetermined contraction of the dry shape-memory adhesive that was removed.

38. The method of claim 30, further comprising removing the second dry shape-memory adhesive material after about 2 to 14 days, inspecting the wound, and applying a third dry shape memory adhesive material to the tissue surface surrounding the wound if a reduction of wound area is less than about 50%.

39. The method of claim 36, further comprising after removing the second dry shape-memory adhesive material, inspecting the wound and selecting the third dry shape-memory adhesive with a predetermined contraction based on wound inspection.

40. The method of claim 39, wherein the predetermined contraction of the third dry shape-memory adhesive is different than a predetermined contraction of the second dry shape-memory adhesive.

\* \* \* \* \*